(12) United States Patent
Golze et al.

(10) Patent No.: US 6,770,712 B2
(45) Date of Patent: Aug. 3, 2004

(54) POLYETHYLENE/LOW MOLECULAR WEIGHT HYDROGENATED ALIPHATIC RESIN BLENDS

(75) Inventors: Gray A. Golze, Kingwood, TX (US); Charles D. Mills, Orange, TX (US); Richard C. Wagner, Orange, TX (US); Eduardo Vega, Jr., Katy, TX (US); Brian Deaton, Orange, TX (US); Rajendra K. Krishnaswamy, Bartlesville, OK (US)

(73) Assignee: Chevron Phillips Chemical Company LP, Houston, TX (US)

( * ) Notice: Subject to any disclaimer, the term of this patent is extended or adjusted under 35 U.S.C. 154(b) by 228 days.

(21) Appl. No.: 10/099,860

(22) Filed: Mar. 15, 2002

(65) Prior Publication Data

US 2003/0125469 A1 Jul. 3, 2003

Related U.S. Application Data

(60) Provisional application No. 60/276,699, filed on Mar. 16, 2001.

(51) Int. Cl.[7] .............................. C08F 8/00; C08L 9/00; C08L 23/00; C08L 23/04; C08L 23/06
(52) U.S. Cl. ...................... 525/191; 525/232; 525/240; 428/500; 428/515
(58) Field of Search .................... 525/191, 232, 525/240; 428/500, 515

(56) References Cited

U.S. PATENT DOCUMENTS

| | | | |
|---|---|---|---|
| 4,545,950 A | 10/1985 | Motooka et al. | 264/210.6 |
| 4,957,679 A | 9/1990 | Moore | 264/152 |
| 5,043,204 A | * 8/1991 | Itaba et al. | 428/213 |
| 5,075,156 A | 12/1991 | Tanaka et al. | 428/212 |
| 5,128,183 A | 7/1992 | Buzio | 428/35.7 |
| 5,141,801 A | 8/1992 | Takeshita et al. | 428/348 |
| 5,155,160 A | 10/1992 | Yeh et al. | 524/487 |
| 5,965,254 A | 10/1999 | Christopherson et al. | 428/349 |
| 6,087,446 A | * 7/2000 | Klosiewicz | 525/197 |
| 6,432,496 B1 | * 8/2002 | Klosiewicz | 428/36.92 |

FOREIGN PATENT DOCUMENTS

| | | |
|---|---|---|
| WO | WO98/55537 | 12/1998 |

OTHER PUBLICATIONS

Krohn, J. V. et al., "Keep It Dry: Optimize Moisture Barrier in PE Films," *Plastics Technology* (Aug. 1999).
Chevron Phillips Chemical Company LP, Technical Data Sheet, "High Density Polyethylene, Blown Film Resin, HiD 9659" (May 2000).
Chevron Phillips Chemical Company LP, Technical Data Sheet, "High Density Polyethylene, Blown Film Resin, HiD 9662" (May 2000).
ExxonMobil Chemical, Technical Data Sheet, "ESCOREZ: Tackifying Resins, Escorez 5300 Series" (2000).
International Search Report for PCT/US02/08000, filed Mar. 15, 2002.

* cited by examiner

*Primary Examiner*—Nathan M. Nutter
(74) *Attorney, Agent, or Firm*—Williams, Morgan and Amerson

(57) ABSTRACT

Compositions and methods are described herein for use in packaging having improved moisture vapor barrier properties. In certain embodiments of the present invention, packaging articles can be made having improved oxygen barrier properties as well. Compositions of the present invention can comprise a low molecular weight hydrogenated aliphatic resin and either a high density polyethylene or a branched or linear low density polyethylene. The low molecular weight hydrogenated aliphatic resin has a weight-average molecular weight of less than about 2000 g/mol. Preferably, the low molecular weight hydrogenated aliphatic resin comprises hydrogenated poly (dicyclopentadiene) or the product of hydrogenating a polymer produced by polymerizing a reaction mixture comprising dicyclopentadiene.

69 Claims, 6 Drawing Sheets

POLYETHYLENE/LOW MOLECULAR WEIGHT HYDROGENATED ALIPHATIC RESIN BLENDS

The present application claims priority from U.S. Provisional Application No. 60/276,699 filed on Mar. 16, 2001, which is incorporated herein by reference.

BACKGROUND OF THE INVENTION

1. Field of the Invention

The present invention relates generally to the field of packaging materials, particularly packaging materials for use with moisture vapor and oxygen sensitive products. It concerns improving moisture vapor and oxygen barrier properties of polyethylene resins by blending them with relatively small amounts of low molecular weight hydrogenated aliphatic hydrocarbon resins.

2. Description of Related Art

Polyethylenes can be classified into two types: (i) high pressure branched low density polyethylene or LDPE and (ii) low pressure or linear polyethylene. Low pressure or linear polyethylene can be further separated into three categories: (iia) high density polyethylene or HDPE, (iib) linear low density polyethylene or LLDPE and (iic) ultra linear low density polyethylene or ULLDPE. Branched LDPE was the first type of polyethylene to be commercialized, and it can be polymerized in high pressure tubular or autoclave reactors. The density of branched LDPE is typically between about 0.910–0.940 g/cm$^3$; it can be heavily and randomly branched with a significant fraction of its branches being longer than the critical entanglement molecular weight of polyethylene.

Polyethylenes with densities higher than about 0.940 g/cm$^3$ are typically referred to as HDPE. These are produced with no comonomer or with very small amounts of comonomers such as α-olefins like hexene, butene, and octane, among others. Comonomer is mixed in with ethylene at low pressures during the polymerization process. HDPE can be produced in slurry loop reactors, solution form reactors or in gas phase fluidized bed reactors. Certain types of HDPE polymer have a small amount of long chain branching.

Linear LDPEs (LLDPEs) are obtained by incorporating sufficient α-olefin comonomers into linear polyethylene to produce polyethylene with a density between about 0.910–0.940 g/cm$^3$. The α-olefin comonomers are essentially excluded from the crystal lattice of polyethylene; therefore, their presence serves to disrupt the crystallizability of the linear chain, which can lead to polyethylenes having lower densities (crystallinity). By definition, LLDPEs comprise essentially no (e.g., less than about 0.1% by weight of the polyethylene) long branches (e.g., branches longer than the critical entanglement molecular weight of polyethylene). These polymers can be produced in low pressure gas phase fluidized bed reactors, solution process reactors or in slurry loop reactors.

Ultra linear low density polyethylenes, ULLDPEs, which incorporate even higher levels of α-olefin comonomers into linear polyethylene have densities lower than about 0.910 g/cm$^3$ and can be produced in reactors similar to those used to produce LLDPEs.

Polyethylenes can be used in the manufacture of a number of different packaging items using a variety of conversion processes such as blow molding, injection molding, sheet extrusion, blown film extrusion and cast film extrusion. Polyethylenes can also be used as components in multilayer packaging articles, which are manufactured using coextruded blown film, coextruded cast film, coextruded blow molding and other processes such as extrusion coating and laminations. Through the use of these various processing techniques, polyethylenes can be used to package a number of different food and non-food finished goods such as milk (e.g., blow molded bottles), bread (e.g., blown and cast films), paper products (e.g., extrusion coating, cast and blown film), applesauce (thermoformed sheet) and cleaning supplies (e.g., injection and blow molded bottles).

Polyethylenes are used in packaging items because they provide at least some resistance to moisture, gases, acids, bases, and solvents, while retaining package integrity by virtue of their impact strength, tear strength, stiffness, and other key attributes or properties. While certain polyethylenes have relatively low moisture vapor and oxygen transmission rates, there are other polymers with still lower moisture and oxygen transmission rates than polyethylenes. Thus, it would be advantageous to produce packaging items comprising polyethylene (e.g., HDPE, LLDPE, ULLDPE and LDPE) with improved moisture and oxygen barrier, while minimizing any increase in manufacturing cost or significantly decreasing other desirable properties imparted by polyethylene to the packaging item.

SUMMARY OF THE INVENTION

One aspect of the present invention is directed to compositions comprising relatively low levels (e.g., less than 3 wt %) of a low molecular weight hydrogenated aliphatic resin and a linear high density polyethylene (HDPE). Preferably such a composition comprises between about 99.5 wt % and 95 wt % of a high density polyethylene. The composition can have a normalized moisture vapor transmission rate (normalized MVTR) of less than about 0.35 g·mil/100 in$^2$/day, when a blown film is prepared from the composition. By convention, the value obtained for MVTR is expressed as grams of water transmitted per 100 square inches in a 24-hour period (or, in metric system, grams of water transmitted per square meter in a 24-hour period). This value can be normalized for film thickness by several commonly accepted methods. The MVTR values referenced in this application are normalized for film thickness by multiplying the MVTR g/100 in$^2$/day by the film thickness in mils resulting in a unit of g·mil/100 in$^2$/day (e.g., normalized MVTR). Such compositions of the present invention can be incorporated in packaging articles, particularly packaging articles used in packaging moisture vapor sensitive products, thereby reducing the exposure of the packaged product to moisture vapors and/or oxygen.

Another aspect of the present invention is directed to a method of preparing such compositions by blending HDPE and less than 3 wt % of a low molecular weight hydrogenated aliphatic resin. In certain embodiments the blend can be extruded, coextruded with other resins, or the blend can be otherwise incorporated into the structure of a packaging article.

Still another aspect of the invention is directed to a packaging article comprising at least one layer that comprises less than 3 wt % of a low molecular weight hydrogenated aliphatic resin and between about 99.5 wt % and 95 wt % high density polyethylene. Such packaging articles can be coatings, molded articles, or films, and the films can be cast, blown or undergo other post oriented processing.

Yet another embodiment of the present invention is directed to a moisture resistant composition comprising a low molecular weight hydrogenated aliphatic resin that has a weight-average molecular weight of less than about 2000 g/mol, more preferably between about 50 g/mol and 2000 g/mol, most preferably between about 50 g/mol and 1000 g/mol, a low molecular weight high density polyethylene and a second high density polyethylene. The low molecular weight high density polyethylene has a zero-shear viscosity that is less than or equal to about 0.9 times the zero-shear viscosity of the second high density polyethylene, and the second high density polyethylene preferably has a melt index of between about 0.1 dg/min and 100 dg/min.

The composition comprises between about 0.5 and 25 wt % low molecular weight hydrogenated aliphatic resin, between about 8 and 30 wt % low molecular weight high density polyethylene, and between about 45 and 92.5 wt % of the second high density polyethylene. Preferably, the second high density polyethylene is essentially the only other component in the composition besides the low molecular weight hydrogenated aliphatic resin and the low molecular weight high density polyethylene.

A further embodiment of the present invention is directed to a moisture resistant composition, comprising between about 0.5 and 4 wt % of a low molecular weight hydrogenated aliphatic resin, between about 1 and 30 wt % of a low molecular weight high density polyethylene, and between about 66 and 98.5 wt % of a second high density polyethylene. As in embodiments described above, the low molecular weight resin has a weight-average molecular weight of less than about 2000 g/mol, and the low molecular weight high density polyethylene has a zero-shear viscosity that is less than or equal to 0.9 times the zero-shear viscosity of the second high density polyethylene. The second high density polyethylene can have a melt index less of between about 0.1 dg/min and 100 dg/min. Preferably, the composition comprises between about 0.5 and 3.5 wt % of the low molecular weight hydrogenated aliphatic resin, and the second high density polyethylene is essentially the only other component in the composition besides the low molecular weight hydrogenated aliphatic resin and the low molecular weight high density polyethylene.

Certain compositions of the present invention comprise less than about 25 wt % low molecular weight hydrogenated aliphatic resin and a HDPE. Addition of the hydrogenated aliphatic resin at low levels, particularly less than about 3 wt %, to HDPE can permit the blend to have physical properties similar to that of HDPE, while decreasing the moisture vapor transmission rate (MVTR) of the composition relative to that of the base HDPE. That is, certain compositions of the present invention have stiffness and tear resistance similar to that of HDPE blown films, while having a lower MVTR than HDPE, and in certain cases the oxygen transmission rates (OTRs) of the compositions are also less than that of HDPE alone. In addition, limiting the concentration of the low molecular weight hydrogenated aliphatic resin to less than about 3 wt % reduces the amount of resin which can migrate from the packaging article to the food stuffs which are being packaged. Furthermore, since such low molecular weight hydrogenated aliphatic resins can be relatively expensive, certain compositions of the present invention having relatively low percentages of these resins could be produced without substantially increasing the price over that of bulk HDPE.

Another embodiment of the present invention is directed to a moisture resistant composition that comprises between about 0.5 and 25 wt % of a low molecular weight hydrogenated aliphatic resin and between about 99.5 wt % and 75 wt % of a branched or linear low density polyethylene (e.g., branched low density polyethylene (LDPE), linear low density polyethylene (LLDPE), or ultra linear low density polyethylene (ULLDPE)). The branched or linear low density polyethylene has a density of less than about 0.940 g/cm$^3$.

As with the compositions comprising HDPE described above, certain compositions of the present invention comprising low molecular weight hydrogenated aliphatic resin and a branched or linear low density polyethylene can have physical properties similar to that of the branched or linear low density polyethylene, while decreasing the moisture vapor transmission rate (MVTR) of the composition relative to that of the base branched or linear low density polyethylene. That is, certain compositions of the present invention that comprise a branched or linear low density polyethylene and a low molecular weight hydrogenated aliphatic resin can have stiffness and tear resistance similar to that of the branched or linear low density polyethylene, while having a lower MVTR than the branched or linear low density polyethylene, and in certain cases the oxygen transmission rates (OTRs) of the compositions are also less than that of the branched or linear low density polyethylene alone.

Hydrogenated aliphatic resins can have good compatibility for blending with polyethylene. Compositions of the present invention used in packaging can have fewer negative organoleptic effects on packaged products than polyethylene blends comprising low molecular weight hydrocarbon resins that are not hydrogenated. For example, compositions of the present invention have characteristics that should allow them to be approved for food packaging uses. Furthermore certain compositions of the present invention can be processed as films, and down-gauging of such films can result in thinner films that have similar MVTR performance as the base polyethylene.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
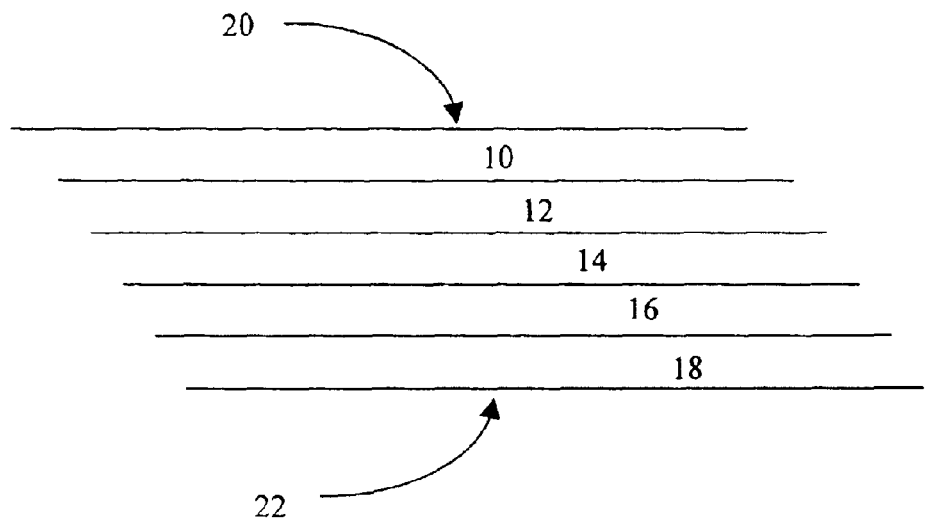
FIG. 1 is a schematic of a five-layer packaging article.

One embodiment of the present invention is directed to a composition that comprises less than 3 wt % of a low molecular weight hydrogenated aliphatic resin and between about 99.5 wt % and 95 wt % of a high density polyethylene.

Preferably, the composition comprises between about 0.5 wt % and 2.9 wt % of the low molecular weight hydrogenated aliphatic resin, more preferably between about 0.5 wt % and 2.5 wt % of the low molecular weight hydrogenated aliphatic resin. Such compositions will preferably have lower normalized moisture vapor transmission rates after processing than the base HDPE (e.g., without a low molecular weight hydrogenated aliphatic resin added) that has been prepared under similar or equivalent extrusion conditions, and they have a similar extruded thickness.

Another embodiment of the present invention is directed to a composition comprising a ternary blend. The composition comprises between about 0.5 and 25 wt % of a low molecular weight hydrogenated aliphatic resin, between about 8 and 30 wt % of a low molecular weight HDPE, and between about 45 and 92.5 wt % of a second HDPE. The low molecular weight resin is as described above. The low molecular weight high density polyethylene has a zero-shear viscosity that is less than or equal to about 0.9 times the zero-shear viscosity of the second high density polyethylene. In certain embodiments, the second high density polyethylene can have a melt index of between about 0.1 dg/min and 100 dg/min. The pellet density of the low molecular weight HDPE is preferably at least about 0.950 g/cm$^3$. The zero-shear viscosity (low-shear rate or low-frequency Newtonian limit) of the polymer is obtained from dynamic mechanical measurements (torsional rheology) performed at 190° C. Preferably the composition is such that the second high density polyethylene is essentially the only other component in the composition besides the low molecular weight hydrogenated aliphatic resin and the low molecular weight high density polyethylene. Such compositions will preferably have lower normalized moisture vapor transmission rates than either of the individual HDPEs contained in the blend, when they are extruded at equivalent conditions and to similar thicknesses. Blown films prepared from such compositions can have a normalized moisture vapor transmission rate (normalized MVTR) of less than about 0.35 g·mil/100 in$^2$/day. Yet another embodiment of the present invention is directed to a composition comprising a ternary blend. The composition comprises between about 0.5 and 4 wt % of a low molecular weight hydrogenated aliphatic resin, between about 1 and 30 wt % of a low molecular weight HDPE, and between about 66 and 98.5 wt % of a second HDPE. The low molecular weight resin, the low molecular weight HDPE, and the second HDPE are as described above. Preferably the composition is such that the second high density polyethylene is essentially the only other component in the composition besides the low molecular weight hydrogenated aliphatic resin and the low molecular weight high density polyethylene. Preferably the composition comprises between about 0.5 and 3.5 wt % of the low molecular weight hydrogenated aliphatic resin. Such compositions will preferably have a lower moisture vapor transmission rate than either of the individual HDPEs contained in the blend when extruded under equivalent conditions and similar thicknesses.

Another embodiment of the present invention is directed to a composition that comprises between about 0.5 and 25 wt % of a low molecular weight hydrogenated aliphatic resin and a branched or linear low density polyethylene (about 75 wt % to about 99.5 wt % branched or linear low density polyethylene). The branched or linear low density polyethylene has a density of less than about 0.940 g/cm$^3$. Such compositions comprising branched or linear low density polyethylene will preferably have a lower normalized moisture vapor transmission rate than the branched or linear low density polyethylene alone when they are processed in the same way and to a similar thickness.

Compositions of the present invention can be incorporated into packaging articles by extruding the composition, by coextruding the composition with other resins to produce a packaging article, by coating the surface of a packaging article with the composition, or by laminating a film comprising the composition to the surface(s) of a packaging article, among others. Blending of a low wt % of a low molecular weight hydrogenated aliphatic resin with polyethylene can in certain cases result in a lower MVTR for the blended composition than for the base polyethylene alone. Certain compositions of the present invention can be used in producing packaging articles, such as blow molded containers (e.g. milk bottles and juice bottles), injection molded articles, coatings, lightweight consumer bags, thermoformed containers from extruded sheets, and various cast, blown and other post oriented packaging films. Furthermore, certain compositions of the present invention that are processed as films can be down-gauged to be thinner films, while retaining similar or better MVTR performance of the base polyethylene at the thicker gauge.

Preferably the low molecular weight hydrogenated aliphatic resin has an average weight-average molecular weight of less than about 2000 g/mol. More preferably, the resin has a weight-average molecular weight in the range of about 50 g/mol and 2000 g/mol. Preferably the low molecular weight hydrogenated aliphatic resin is at least about 95% hydrogenated, more preferably essentially 100% hydrogenated. Furthermore, preferably the low molecular weight hydrogenated aliphatic resin has a glass transition temperature of greater than about 50° C., more preferably greater than about 75° C., and most preferably greater than about 80° C. A preferred low molecular weight polymer can be produced by polymerizing a reaction mixture comprising dicyclopentadiene. The reaction mixture preferably comprises greater than about 95 wt % dicyclopentadiene, however in certain cases the reaction mixture can further comprise other chemical compounds (e.g. olefins). The polymerization is carried out such that the average weight-average molecular weight of the resulting polymer is less than about 2000 g/mol. The product of the polymerization is subsequently hydrogenated and can then be used as the low molecular weight hydrogenated aliphatic resin in the present invention. Most preferably, the low molecular weight hydrogenated aliphatic resin comprises hydrogenated poly (dicyclopentadiene) homopolymer. Examples of suitable low molecular weight hydrogenated aliphatic resins are Regalite T1140 (Hercules, Inc.) and Escorez 5340 and 5320 (ExxonMobil Chemical). Regalite T1140 is derived by the polymerization of an olefin stream rich in dicyclopentadiene. The resulting polymer is preferably hydrogenated to yield a resin with little or no olefinic or aromatic character. Regalite T1140 produced in this manner tends to have a relatively low molecular weight, averaging about 500 g/mol. The molecular weight of the hydrogenated aliphatic resin was measured using size exclusion chromatography. Narrow molecular weight distribution polystyrene standards and broad molecular weight distribution polyethylene standards were used. The solution was prepared and the analysis was carried out at 145° C.

The high density polyethylene used in compositions of the present invention is preferably a linear homopolymer of ethylene, but in some cases the linear polymer can comprise monomers other than those derived from ethylene, such as hexene, butene, and octene, among others. Such monomers can be added in an amount to adjust the density of the HDPE. Preferably the HDPE has a density between about 0.940 and 0.97 g/cc at 23° C., more preferably between about 0.955 and 0.966 g/cc. In general, density correlates to the crystallinity of the HDPE material, in other words, the higher the density of the HDPE, the higher the degree of crystallinity in the material. In certain cases HDPEs comprising monomers other than ethylene will be less crystalline. HDPE is a highly crystalline material with a peak crystalline melting point of between about 135° C. and 127° C., with the HDPE homopolymer tending to having a relatively higher melting point than HDPEs comprising non-ethylenic monomers as described above. The HDPE used in compositions of the present invention can have a melt index of between about 0.1 and 100 dg/min. The preferred melt index of HDPE for compositions of the present invention depends on the process in which the composition is to be used. Preferably the HDPE melt index is between about 0.1 and 7 dg/min for blown film, between about 0.5 and 20 dg/min for cast film, between about 0.1 and 100 dg/min for injection and blow molding, and between about 0.5 and 20 dg/min for coatings. Examples of suitable HDPEs that can be used in embodiments of the present invention include: HiD 9659 (Chevron Phillips Chemical Co.), HiD 9662 (Chevron Phillips Chemical Co.), and mPACT D449 (Chevron Phillips Chemical Co.). All of these resins can be used in packaging for moisture vapor sensitive products. HiD 9659 and HiD 9662 are HDPE resins having a density of about 0.962 g/cc that are marketed for use as blown film resins. HiD 9659 has a melt index of about 1.0 g/10 min and a density of about 0.962 g/cc. HiD 9662 has a melt index of about 1.05 g/10 min and a density of about 0.962 g/cc. mPACT D449 has a density of 0.945 g/cc and a melt index of about 0.8 g/10 min.

A low molecular weight HDPE can be used in certain embodiments of the present invention, and the low molecular weight high density polyethylene has a zero-shear viscosity that is less than or equal to 0.9 times the zero-shear viscosity of the second high density polyethylene. The second high density polyethylene can have a melt index of between about 0.1 dg/min and 100 dg/min. The pellet density of the low molecular weight HDPE is preferably at least about 0.950 g/cm$^3$ at 23° C., more preferably between about 0.950 and 0.977 g/cm$^3$. The zero-shear viscosity (low-shear rate or low-frequency Newtonian limit) of the polymer is obtained from dynamic mechanical measurements (torsional rheology) performed at 190 C. An example of a suitable low molecular weight HDPE is HiD 9708 (Chevron Phillips Chemical Co.). HiD 9708 has melt index of about 8.0 dg/min and its density is about 0.962 g/cc.

Certain embodiments of the present invention can comprise a branched or linear low density polyethylene, which has a density of less than about 0.940 g/cm$^3$, and a melt index of between 0.1 and 100 dg/min. An example of a suitable LDPE, PE4517 resin (Chevron Phillips Chemical Co.), has a density of 0.923 g/cc and a melt index of 5.0 g/10 min.

Preferably compositions of the present invention comprise at least one primary antioxidant along with the HDPE and the low molecular weight hydrogenated aliphatic resin. The primary antioxidant can aid in maintaining the properties of the polymer during processing and can be a primary antioxidant known in the art, such as a phenolic antioxidant. Preferably, the composition comprises at least about 100 ppm of the primary antioxidant. More preferably the composition comprises both a primary antioxidant and a secondary antioxidant. The secondary antioxidant can be a secondary antioxidant known in the art, such as a phosphite antioxidant. For example, Irganox 1076 (n-octadecyl 3-(3, 5-di-t-butyl-4-hydroxyphenyl propionate, Ciba) can be used as a primary antioxidant and Irgafos 168 (Tris(2,4-ditert-butylphenyl)phosphite, Ciba) can be used as a secondary antioxidant among others, which can be used as antioxidants in certain embodiments of the present invention. Compositions of the present invention can comprises other additives known in the art, such as UV protectant materials and antifogging agents, among others.

Another embodiment of the present invention is directed to a method of preparing a composition as described above comprising blending high density polyethylene with a low molecular weight hydrogenated aliphatic resin. The blend comprises less than 3 wt % of the low molecular weight hydrogenated aliphatic resin and between about 99.5 wt % and 95 wt % high density polyethylene. Preferences for the blend are as described above for the composition. The method can comprise blending at least one antioxidant, as described above, with the HDPE and the low molecular weight hydrogenated aliphatic resin.

The blending can be done using methods known in the art, for example the HDPE and the low molecular weight hydrogenated aliphatic resin can be melt blended (e.g., compounded) or dry blended, depending in part on whether or not the hydrogenated low molecular weight hydrogenated resin is blended with the HDPE as a component of a masterbatch. Raw low molecular weight hydrogenated aliphatic resin (e.g., comprising essentially no other resins) can be blended with the HDPE or the low molecular weight hydrogenated aliphatic resin can be blended with the HDPE as a component of a masterbatch. The masterbatch comprises the low molecular weight hydrogenated aliphatic resin and at least one other component (e.g., polyethylene, antioxidants, or other resins, among others). Such a masterbatch can comprise a relatively high wt % of the low molecular weight hydrogenated aliphatic resin. A masterbatch comprising about 50 wt % of the low molecular weight hydrogenated aliphatic resin and 50 wt % HDPE was used as in Examples 1–3 described below. In certain embodiments, the method can further comprise blends being coextruded with other resins or extruded, or the blend can be incorporated in a packaging article (e.g. laminating a film comprising the composition to a packaging article or coating the blend onto the surface of a packaging article, among others). Extrusion, coextrusion and incorporation of the blend into packaging articles can be performed using methods known in the art.

Yet another embodiment of the present invention is directed to a packaging article, comprising at least one layer that comprises less than 3 wt % of the low molecular weight hydrogenated aliphatic resin and between about 99.5 wt % and 95 wt % high density polyethylene. Preferences for the layer are as described above for the composition. The packaging article can be a film, such as a cast film or a blown film or any other post oriented film. In certain cases if the packaging article is a post oriented film, the film can be biaxially oriented. Preferably the packaging article has from 2 to 7 layers, but the packaging article can comprise more layers.

Figure 2:
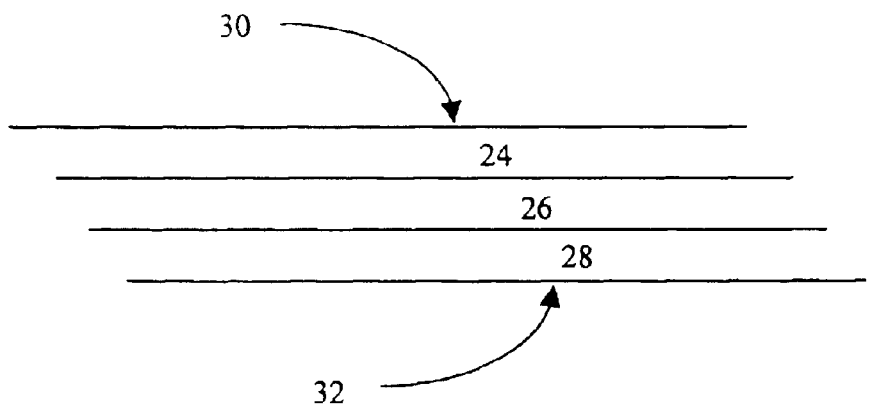
FIG. 2 is a schematic of a three-layer packaging article.
Figure 3:
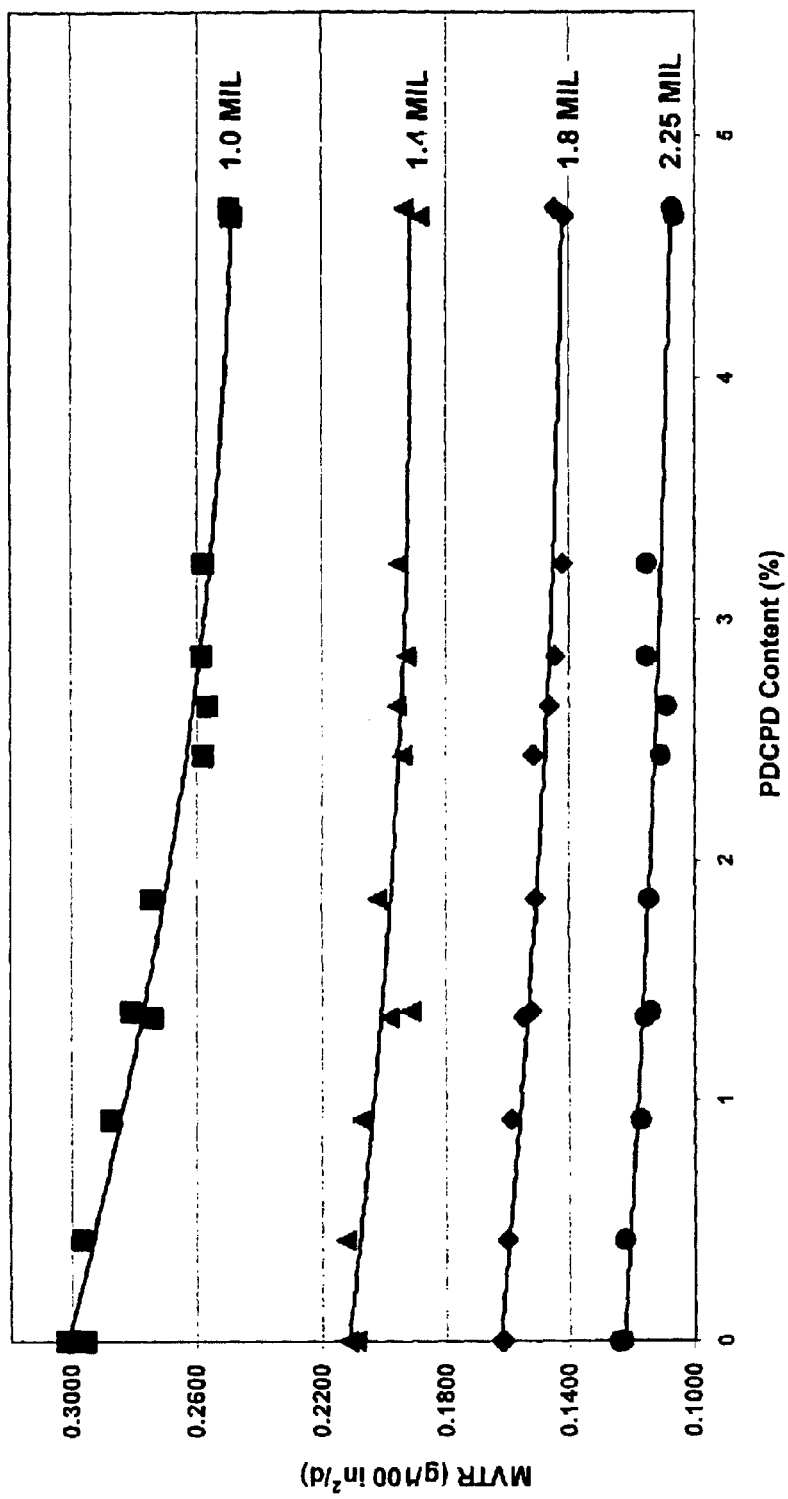
FIG. 3 is a graph plotting MVTR vs. % hydrogenated polydicyclopentadiene content in films of various thicknesses.
Figure 4:
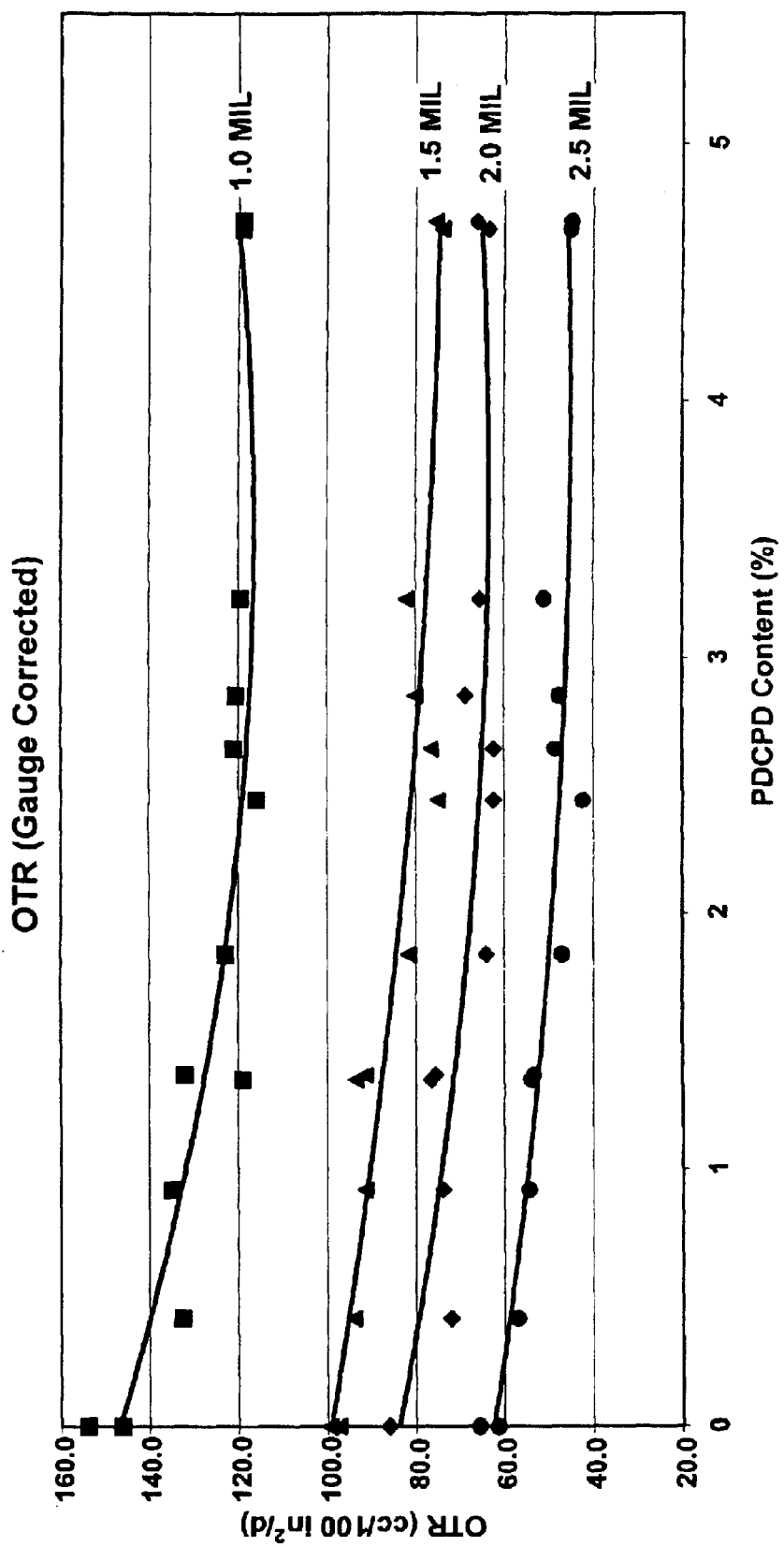
FIG. 4 is a graph plotting OTR vs. % hydrogenated polydicyclopentadiene content in films of various thicknesses.
Figure 5:
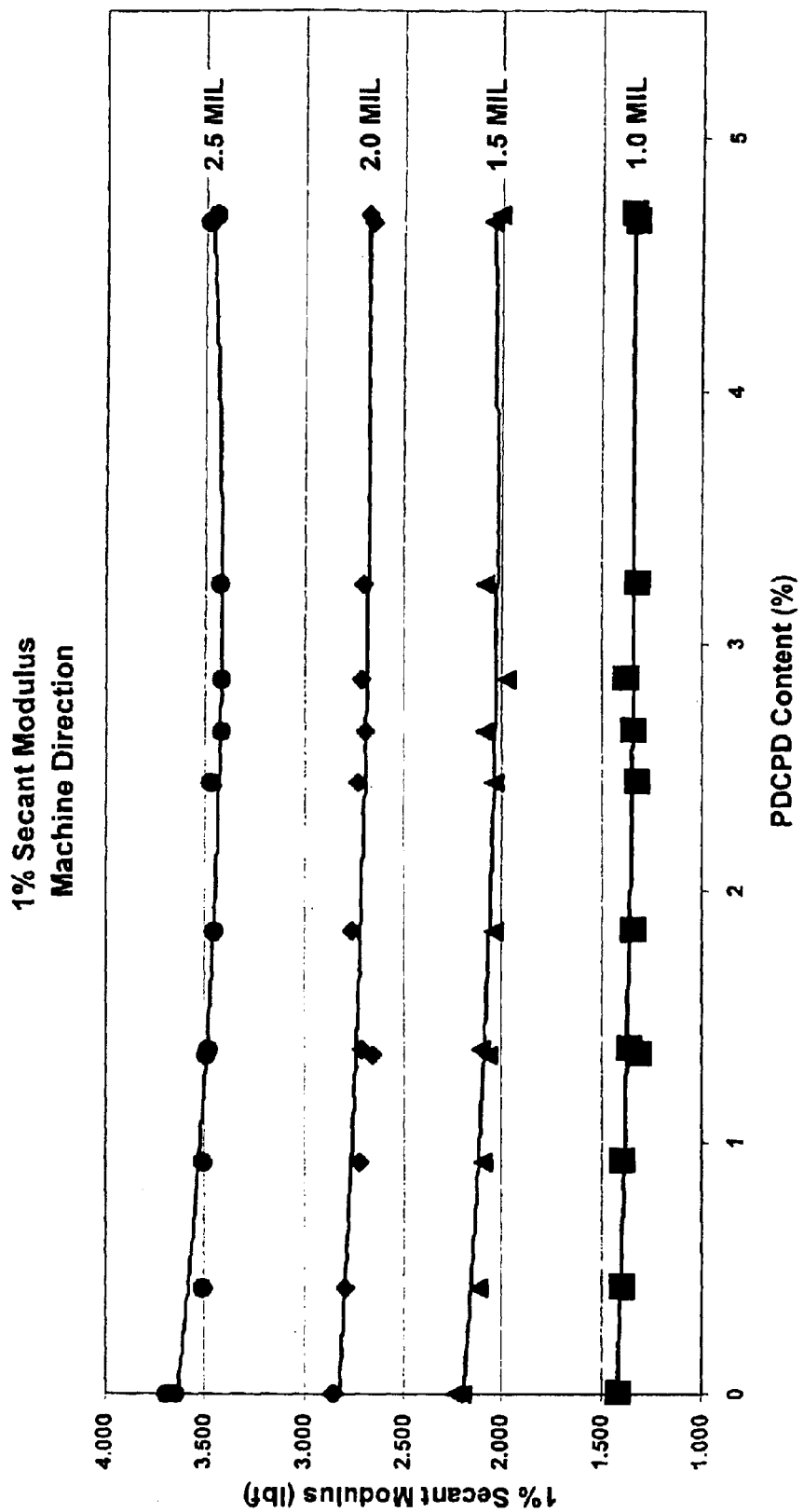
FIG. 5 is a graph plotting 1% Secant Modulus in Machine Direction vs. % hydrogenated polydicyclopentadiene content in films of various thicknesses.
Figure 6:
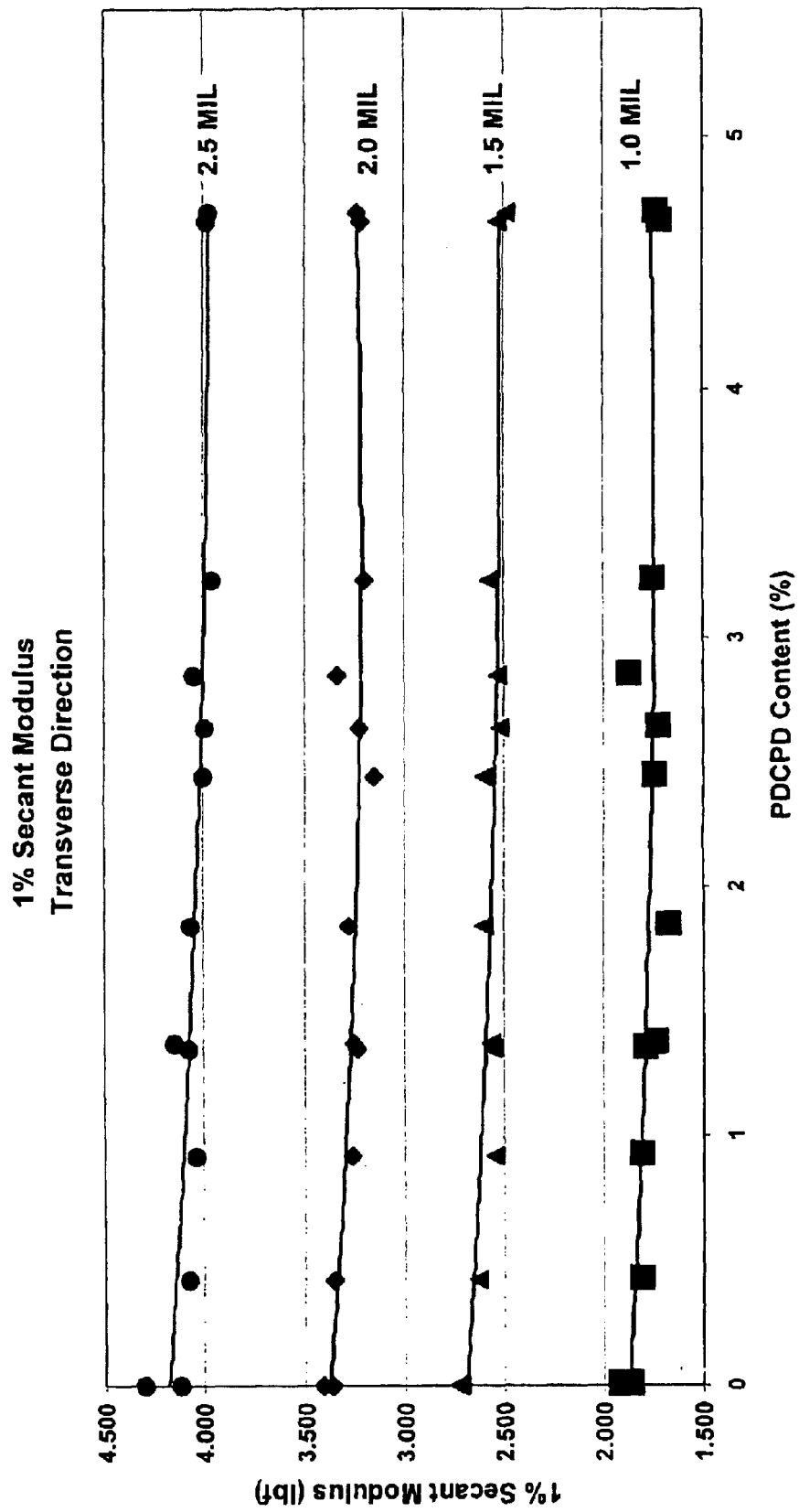
FIG. 6 is a graph plotting 1% Secant Modulus in Transverse Direction vs. % hydrogenated polydicyclopentadiene content in films of various thicknesses.
Figure 7:
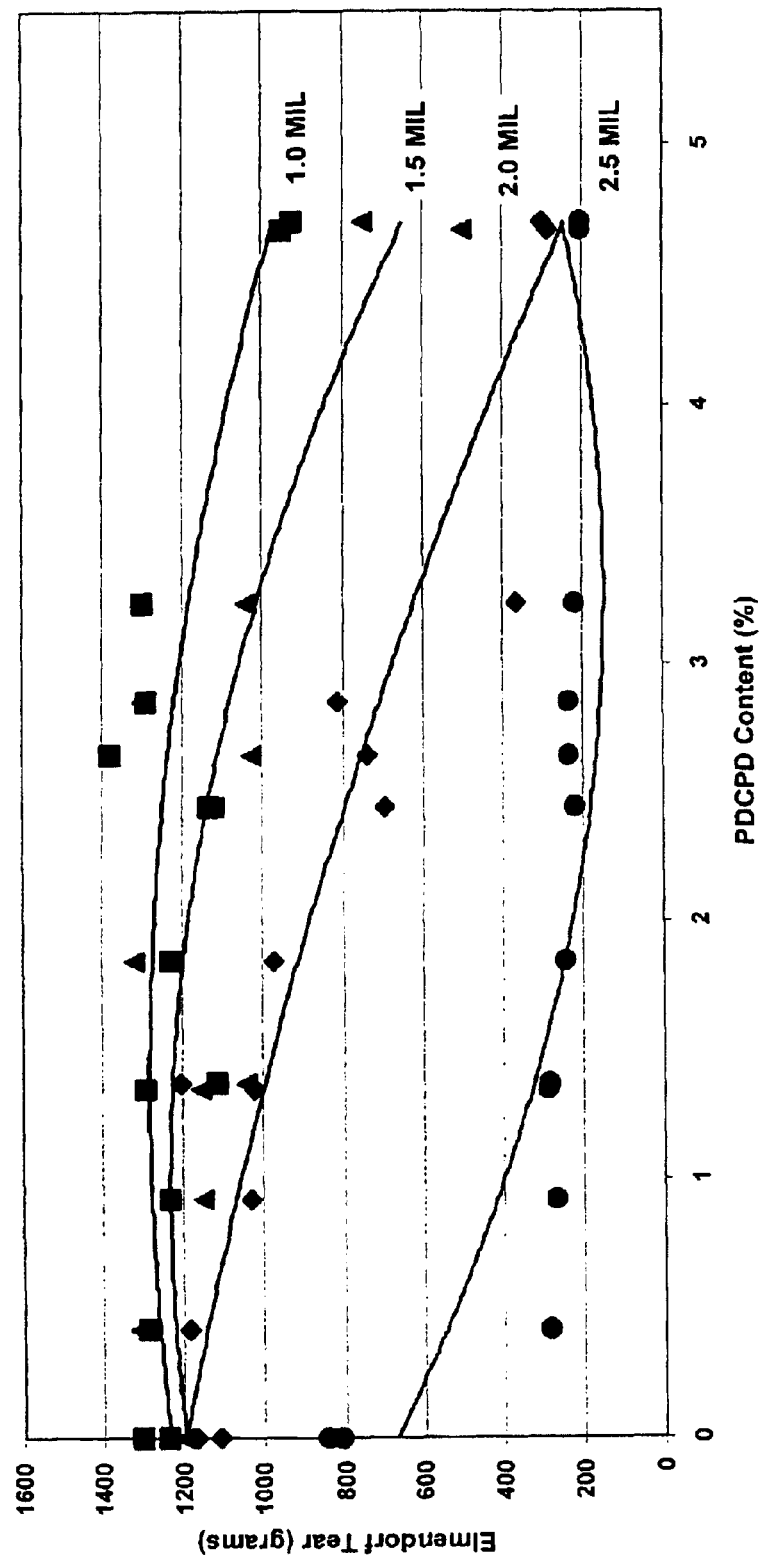
FIG. 7 is a graph plotting TD Elmendorf Tear vs. % hydrogenated polydicyclopentadiene content in films of various thicknesses.

Certain embodiments of the present invention can be better understood by reference to FIGS. 1 and 2. Two different film constructions are shown in the figures. FIG. 1 is a five-layer moisture vapor barrier film construction. FIG. 2 is a three-layer moisture vapor barrier film. Methods known in the art can be used to form multi-layered films as depicted in FIGS. 1 and 2. Such three and five layer constructions can, for example, be made by coextrusion and used in packaging for moisture vapor sensitive foods. In FIG. 1, the interior surface of the film 20 is closest to the product to be packaged. The exterior surface of the film 22 is exposed to the external environment. At least one of the five layers of the film (the most exterior layer 18 (e.g., skin layer), the core layers 12, 14 and 16, or the most interior layer 10) comprises less than 3 wt % of a low molecular weight hydrogenated aliphatic resin and between about 99.5 wt % and 95 wt % high density polyethylene. Preferably, layer 18 is about 10% to 20% of the total thickness, layers 12, 14 and 16 combined are preferably about 60% to 80% of the thickness, and layer 10 is about 10% to 20% of the thickness of the product film. For example, layer 10 can be a sealant material, layers 14, 16, and 18 can be HDPE with a melt index of less than 1.5 g/10 min and layer 12 can comprise about 2.5 wt % of a low molecular weight hydrogenated aliphatic resin and about 97.5 wt % high density polyethylene.

Similarly, in FIG. 2, the interior surface of the film 30 is closest to the product to be packaged. The exterior surface of the film 32 is exposed to the external environment. At least one of the three layers of the film (the most exterior layer 28 (e.g., skin layer), the core layer 26, or the most interior layer (e.g., seal layer) 24) comprises less than 3 wt % of a low molecular weight hydrogenated aliphatic resin and between about 99.5 wt % and 95 wt % high density polyethylene. Preferably, layer 28 is about 10% to 20% of the total thickness, layer 26 preferably is about 60% to 80% of the thickness, and layer 24 is about 10% to 20% of the thickness of the product film. For example, layer 24 can be a sealant material, layer 26 can comprise about 2.5 wt % of a low molecular weight hydrogenated aliphatic resin and about 97.5 wt % high density polyethylene, and layer 28 can comprise a HDPE resin with a melt index of about 1.0 g/10 min.

Compositions of the present invention can also be used in producing a monolayer film. Commercial viability of monolayer applications is generally dependent on the heat sealing qualities of the PE blend. Compositions of the present invention that are monolayer films can be laminated to other films or paper to make a packaging article with improved barrier properties.

One advantage of compositions of the present invention is that they can be advantageously used to form film of relatively low normalized MVTR. Further, the compositions of the present invention are advantageous in that the same composition can be used for the skin layer (e.g. 18 in FIGS. 1 and 28 in FIG. 2) of the coextruded construction and at least one core layer.

Prior to this work, some constructions being produced for their moisture vapor barrier properties had a higher melt index HDPE resin as the skin layer of the construction and a lower melt index HDPE resin as a core layer or layers in order to achieve improved moisture vapor barrier properties than a film using the lower melt index HDPE in both the skin and core layers.

As referenced in the August 1999 issue of *Plastics Technology* in the article "Keep It Dry: Optimize Moisture Barrier in PE Films", five-layer constructions (similar to FIG. 1) have been made with a skin layer or outside layer 18 of the film with HDPE having a higher melt index. The three core layers, 12, 14 and 16 in FIG. 1, generally consist of a HDPE having a lower melt index between. As mentioned above, layer 10 in FIG. 1 is the seal layer in the coextruded construction. Resins used in the seal layer 10 generally demonstrate a low crystallinity and as such do not appreciably contribute to the MVTR performance of the film.

As is the case in the five-layer construction, a typical three-layer construction (similar to FIG. 2) can comprise a higher melt index HDPE layer, as the skin layer 28. The core layer 26 in the three-layer construction generally comprises a HDPE having a lower melt index. The seal layer 24 in the three-layer construction comprises a sealant material.

Compositions of the present invention can be used for both the skin layer 28 and core layer 26 of the three-layer construction (FIG. 2) and in layers 18, 16, 14 and 12 of the five-layer construction (FIG. 1) to achieve substantially equivalent barrier properties to the conventional systems requiring different grades of HDPE in the skin and core layer(s). Using the same composition in two layers is attractive for film manufacturers for convenience in both production of film and the inventory of resin. Since compositions of the present invention can eliminate the need for a separate skin and core layer resin, film processors can reduce the number of resins they must inventory and the need for tracking two different resins within the transfer systems of the plant is eliminated.

Using compositions of the present invention, the high melt index outside skin (layer 28 in the three-layer coextrusion and layer 18 in the five-layer coextrusion) of 2 g/10 min melt index or greater per the prior art can be replaced by a HDPE/low molecular weight hydrogenated aliphatic resin composition of the present invention. And, the same composition can be used for the core layers, and yet still achieve attractive performance, such as low MVTR for the overall film.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Two different types of hydrogenated poly (dicyclopentadiene) (PDCPD) resins were used in the following examples, a masterbatch (MB) comprising about 50 wt % HDPE and 50 wt % hydrogenated PDCPD and raw hydrogenated PDCPD not previously blended with HDPE (such as Regalite T1140 Hercules, Inc. and Escorez 5340 and 5320 ExxonMobil Chemical).

Several different high density polyethylene resins were used in the following examples, including: HiD 9659 (Chevron Phillips Chemical Co.), HiD 9662 (Chevron Phillips Chemical Co.), mPACT D449 (Chevron Phillips Chemical Co.), Resin Y, and Resin Z. All of these resins can be used in packaging for moisture vapor sensitive products. HiD 9659 and HiD 9662 are HDPE resins having a density of about 0.962 g/cc that are marketed for use as blown film resins. HiD 9659 has a melt index of about 1.0 g/10 min and a density of about 0.962 g/cc. HiD 9662 has a melt index of about 1.05 g/10 min and a density of about 0.962 g/cc. mPACT D449 has a density of 0.945 g/cc and a melt index of about 0.8 g/10 min. Both resin Y and resin Z are HDPE resins with melt index values of about 1.0 g/10 min and a density of about 0.962 g/cc. Resin Y is produced using a heterogeneous catalyst comprising chromium and titanium on a solid support. Resin Z is produced using a catalyst comprising a cyclopentadienyl chromium compound supported on a solid refractory material.

PE4517 (Chevron Phillips Chemical Co.), a low density polyethylene was used in certain examples below. The resin has a density of 0.923 g/cc and a melt index of 5.0 g/10 min.

Compounding of HDPE resins was performed on a 30 mm or a 58 mm Werner-Pfleiderer ZSK twin screw extruder with either strand cut or under water pellet cut. The melt temperature was about 475° F. All HDPE extrusion trials performed in the following examples were conducted using a Kiefel blown film extrusion line operating under standard HDPE MVTR blown film extrusion conditions, unless indicated otherwise. A Kiefel 60 mm grooved feed extruder was used with 23:1 L/D (length to diameter ratio), 100 mm die and a die gap of about 1.6 mm.

| Kiefel Operating Conditions | | | |
|---|---|---|---|
| Extruder | Zone 1 | Deg F. | 375 |
| | Zone 2 | Deg F. | 400 |
| | Zone 3 | Deg F. | 400 |
| Adaptor | | Deg F. | 400 |
| Die | Zone 1 | Deg F. | 400 |
| | Zone 2 | Deg F. | 400 |
| Output | | lbs/hr | 100 |
| Frostline Height | | inches | 13 |
| Layflat | | inches | 18 |
| Blow Up Ratio | | | 2.9 |

MVTR (Moisture Vapor Transmission Rate) or WVTR (Water Vapor Transmission Rate), as it is sometimes called, was determined for compositions in a two-step process, involving extrusion and measurement. Compositions were first converted into film using blown or cast film extrusion methods. Since extrusion conditions have a significant effect on the MVTR exhibited, extrusion temperatures, extruder output rates, cooling rates, film gauge, die gap, and, in the case of blown film, blow-up ratio, were controlled during extrusion of the resin and held constant when comparing the MVTR properties of two or more resins.

Following the extrusion of the composition into film, the actual measurement of MVTR was performed using a Mocon Permatran-W3/31 MVTR testing system (Modern Controls, Inc.), or equivalent (e.g. American Society for Testing and Materials (ASTM) method F1249). The methods for determining oxygen transmission rate (OTR), 1% Secant Modulus, and transverse direction (TD) and machine direction (MD) tear (Elmendorf Tear) were performed according to ASTM methods, D 3985, D 881, and D 1922, respectively. The results of testing various HDPE and HDPE blend films in the following examples are presented in the tables below.

Example 1

Evaluation of the Effect on the Moisture Vapor Transmission Rate of Blending Masterbatch poly (dicyclopentadiene) with HiD 9659 HDPE at Low Wt %

Hydrogenated PDCPD in masterbatch form (50 wt % HDPE and 50 wt % hydrogenated PDCPD) was dry blended into HiD 9659 at concentrations of 1 wt % (Blend 1) and 5 wt % (Blend 2). These addition rates of the masterbatch were equivalent to an effective addition of 0.5% and 2.5% of raw hydrogenated PDCPD.

TABLE 1

| Resin | | HiD 9659 | Blend 1 | Blend 2 |
|---|---|---|---|---|
| Masterbatch Addition | | | 1% | 5% |
| Active Ingredient (PDCPD) | | | 0.50% | 2.50% |
| Incorporation Method | | | MB/Dryblend | MB/Dryblend |
| Basis Weight Gauge | mils | 1.12 | 1.14 | 1.19 |
| MVTR (Raw) | g/100 in$^2$/d | 0.269 | 0.249 | 0.217 |
| nMVTR | g-mils/100 in$^2$/d | 0.301 | 0.283 | 0.258 |
| MVTR Improvement | | | 5.9 | 14.2 |
| Raw OTR | cc/100 in$^2$/d | 125 | 116 | 105 |
| nOTR | cc-mils/100 in$^2$/d | 140 | 132 | 125 |
| OTR Improvement | % | | 5.5 | 10.8 |

The HiD 9659 HDPE/hydrogenated PDCPD (MB) blends having 0.5 to about 2.5 wt % of hydrogenated PDCPD had improved (e.g. reduced) moisture vapor transmission rates (MVTRs) and oxygen transmission rates (OTRs) relative to the HiD 9659 HDPE alone. For example, a blend of HiD 9659 HDPE and MB with 2.5 wt % hydrogenated PDCPD had about a 14.2% lower MVTR than the HiD 9659 HDPE alone.

Example 2

Evaluation of the Effect on the Moisture Vapor Transmission Rate of Blending Masterbatch poly (dicyclopentadierne) with Resin Y at Low Wt %

MB was dry blended into Resin Y at 1, 5 and 10 wt %. These addition rates of the masterbatch were equivalent to an effective addition of 0.5, 2.5 and 5 wt % of raw hydrogenated PDCPD. In addition to the dry blend addition of MB to Resin Y, a second set of samples were evaluated in which MB was melt blended into Resin Y fluff at a 5 wt % level (equivalent to 2.5 wt % hydrogenated PDCPD).

TABLE 2

| SAMPLE | | | Resin Y | Blend 1 | Blend 2 | Blend 3 | C5H-0102 | C5H-0103 |
|---|---|---|---|---|---|---|---|---|
| Base | | | | | | | Resin Y Base | Resin Y Base |
| Masterbatch Addition | | % | 0 | 1 | 5 | 10 | | 5 |
| PDCPD Concentration | | % | | 0.5 | 2.5 | 5 | | 2.5 |
| Incorporation Method | | | | MB/Dryblend | MB/Dryblend | MB/Dryblend | | MB/Compounded |
| FILM PROPERTIES (1.35 mil) | | | | | | | | |
| 1% Secant Modulus | MD | psi | 161300 | 153400 | 145500 | 146600 | 154500 | 142800 |
| | TD | psi | 205900 | 196000 | 181800 | 185500 | 199000 | 174100 |

TABLE 2-continued

| SAMPLE | | | Resin Y | Blend 1 | Blend 2 | Blend 3 | C5H-0102 | C5H-0103 |
|---|---|---|---|---|---|---|---|---|
| Tear Strength | MD | g/mil | 15.6 | 15.8 | 15.5 | 14.1 | 15.4 | 17 |
| | TD | g/mil | 792 | 850 | 340 | 200 | 850 | 457 |
| BARRIER PROPERTIES MVTR 0.90 MIL FILM | | | | | | | | |
| Basis Weight Gauge | | mils | 0.91 | 0.92 | 0.91 | 0.92 | 0.94 | 0.86 |
| Raw MVTR | | g/100 in$^2$/d | 0.326 | 0.289 | 0.292 | 0.251 | 0.326 | 0.311 |
| nMVTR | | g-mils/100 in$^2$/d | 0.297 | 0.266 | 0.266 | 0.231 | 0.306 | 0.267 |
| Improvement | | % | | 10.38 | 10.43 | 22.16 | | 12.72 |
| 1.35 MIL FILM | | | | | | | | |
| Basis Weight Gauge | | mils | 1.34 | 1.37 | 1.31 | 1.33 | 1.26 | 1.29 |
| Raw MVTR | | g/100 in$^2$/d | 0.212 | 0.2 | 0.196 | 0.182 | 0.226 | 0.206 |
| nMVTR | | g-mils/100 in$^2$/d | 0.284 | 0.274 | 0.257 | 0.242 | 0.285 | 0.266 |
| Improvement | | % | | 3.55 | 9.62 | 14.79 | | 6.46 |
| 1.75 MIL FILM | | | | | | | | |
| Basis Weight Gauge | | mils | 1.75 | 1.75 | 1.79 | 1.73 | 1.78 | 1.77 |
| Raw MVTR | | g/100 in$^2$/d | 0.155 | 0.137 | 0.131 | 0.123 | 0.148 | 0.131 |
| nMVTR | | g-mils/100 in$^2$/d | 0.271 | 0.240 | 0.234 | 0.213 | 0.263 | 0.232 |
| Improvement | | % | | 11.61 | 13.55 | 21.55 | | 14.52 |
| PDCPD Concentration | | % | | 0.5 | 2.5 | 5 | | |
| Incorporation Method | | | | MB/Dryblend | MB/Dryblend | MB/Dryblend | | |
| OTR 0.90 MIL FILM | | | | | | | | |
| Basis Weight Gauge | | mils | 0.91 | 0.92 | 0.91 | 0.92 | | |
| Raw O$_2$ Transmission | | cc/100 in$^2$/d | 200 | 139 | 124 | 104 | | |
| nOTR | | cc-mils/100 in$^2$/d | 182 | 128 | 113 | 96 | | |
| Improvement | | % | | 29.74 | 38.00 | 47.43 | | |
| 1.35 MIL FILM | | | | | | | | |
| Basis Weight Gauge | | mils | 1.34 | 1.37 | 1.31 | 1.33 | | |
| Raw O$_2$ Transmission | | cc/100 in$^2$/d | 97 | 90 | 88 | 68 | | |
| nOTR | | cc-mils/100 in$^2$/d | 130 | 123 | 115 | 90 | | |
| Improvement | | % | | 5.14 | 11.31 | 30.42 | | |
| 1.75 MIL FILM | | | | | | | | |
| Basis Weight Gauge | | mils | 1.75 | 1.75 | 1.79 | 1.73 | | |
| Raw O$_2$ Transmission | | cc/100 in$^2$/d | 87 | 69 | 63 | 64 | | |
| nOTR | | cc-mils/100 in$^2$/d | 152 | 121 | 113 | 111 | | |
| Improvement | | % | | 20.69 | 25.93 | 27.28 | | |

Based on these results, dry blending of the PDCPD masterbatch (MB) into Resin Y can lead to better (lower) MVTRs and OTRs. Furthermore the Resin Y HDPE/ hydrogenated PDCPD (MB) blends demonstrate acceptable physical properties, tear strength and 1% secant modulus.

Example 3

Evaluation of the Effect on the Moisture Vapor Transmission Rate of Blending Masterbatch poly (dicyclopentadiene) with Resin Y and Resin Z HDPE at Low Wt %

1 and 5 wt % of MB (equivalent of 0.5 and 2.5 wt % hydrogenated raw PDCPD) were dry blended into the two HDPE resins, Resin Y and Resin Z. The blend was used in preparing blown films.

TABLE 3

| RESIN | | Resin Y | Blend 1 | Blend 2 | Resin Z | Blend A | Blend B |
|---|---|---|---|---|---|---|---|
| Description | | Control | | | Control | | |
| Masterbatch Addition | % | 0 | 1 | 5 | 0 | 1 | 5 |
| PDCPD Concentration | % | 0 | 0.5 | 2.5 | 0 | 0.5 | 2.5 |

TABLE 3-continued

| RESIN | | | Resin Y | Blend 1 | Blend 2 | Resin Z | Blend A | Blend B |
|---|---|---|---|---|---|---|---|---|
| Incorporation Method | | | | MB/Dryblend | MB/Dryblend | | MB/Dryblend | MB/Dryblend |
| RESIN PROPERTIES | | | | | | | | |
| Hexane Extractables | | % | 0.69 | 1.34 | 2.98 | 0.38 | 1.05 | 2.82 |
| Xylene Extractables | | % | 0.92 | 1.52 | 3.05 | 0.52 | 1.06 | 2.81 |
| FILM PROPERTIES | | | | | | | | |
| Elmendorf Tear (0.90 mils) | MD | g/mil | 21 | 22 | 19 | 29 | 30 | 41 |
| | TD | g/mil | 846 | 660 | 718 | 1160 | 1380 | 800 |
| Elmendorf Tear (1.25 mils) | MD | g/mil | 20 | 17 | 15 | 21 | 22 | 25 |
| | TD | g/mil | 542 | 423 | 648 | 1098 | 994 | 1054 |
| Elmendorf Tear (1.75 mils) | MD | g/mil | 16 | 15 | 15 | 18 | 20 | 17 |
| | TD | g/mil | 712 | 689 | 260 | 754 | 714 | 431 |
| 1% Secant Modulus | MD | psi | 154100 | 144800 | 139600 | 141400 | 135200 | 130800 |
| | TD | psi | 205500 | 193900 | 187200 | 203100 | 195100 | 182200 |
| BARRIER PROPERTIES | | | | | | | | |
| MVTR | | | | | | | | |
| 0.9 Mil Film | | | | | | | | |
| Basis Weight Gauge | | mils | 0.8 | 0.81 | 0.87 | 0.86 | 0.86 | 0.91 |
| MVTR | Raw | g/100 in$^2$/d | 0.391 | 0.364 | 0.309 | 0.364 | 0.339 | 0.286 |
| nMVTR | | g-mils/100 in$^2$/d | 0.313 | 0.295 | 0.269 | 0.313 | 0.292 | 0.260 |
| MVTR Improvement vs. Base | | % | | 5.7 | 14.1 | | 6.9 | 16.9 |
| 1.25 Mil Film | | | | | | | | |
| Basis Weight Gauge | | mils | 1.195 | 1.14 | 1.13 | 1.23 | 1.23 | 1.25 |
| MVTR | Raw | g/100 in$^2$/d | 0.2248 | 0.2211 | 0.2194 | 0.2084 | 0.1895 | 0.1709 |
| nMVTR | | g-mils/100 in$^2$/d | 0.269 | 0.252 | 0.248 | 0.256 | 0.233 | 0.214 |
| MVTR Improvement vs. Base | | % | 0.0 | 6.2 | 7.7 | 0.0 | 9.1 | 16.7 |
| 1.75 Mil Film | | | | | | | | |
| Basis Weight Gauge | | mils | 1.63 | 1.54 | 1.68 | 1.67 | 1.66 | 1.64 |
| MVTR | Raw | g/100 in$^2$/d | 0.152 | 0.157 | 0.124 | 0.140 | 0.134 | 0.128 |
| nMVTR | | g-mils/100 in$^2$/d | 0.248 | 0.242 | 0.208 | 0.234 | 0.222 | 0.210 |
| MVTR Improvement vs. Base | | % | | 2.4 | 15.9 | | 4.9 | 10.2 |
| Description | | | Control | | | Control | | |
| Masterbatch Addition | | % | 0 | 1 | 5 | 0 | 1 | 5 |
| PDCPD Concentration | | % | 0 | 0.5 | 2.5 | 0 | 0.5 | 2.5 |
| Incorporation Method | | | | MB/Dryblend | MB/Dryblend | | MB/Dryblend | MB/Dryblend |
| OTR | | | | | | | | |
| 0.9 Mil Film | | | | | | | | |
| Basis Weight Gauge | | mils | 0.8 | 0.8 | 0.83 | 0.8 | 0.8 | 0.8 |
| OTR | Raw | cc/100 in$^2$/d | 167 | 160 | 132 | 169 | 159 | 133 |
| nOTR | | cc-mils/100 in$^2$/d | 134 | 128 | 109 | 135 | 127 | 107 |
| OTR Improvement vs. Base | | % | | 4.3 | 18.3 | | 5.6 | 20.9 |
| 1.25 Mil Film | | | | | | | | |
| Basis Weight Gauge | | mils | 1.23 | 1.25 | 1.3 | 1.3 | 1.35 | 1.33 |
| OTR | Raw | cc/100 in$^2$/d | 104 | 98 | 92 | 108 | 95 | 87 |
| nOTR | | cc-mils/100 in$^2$/d | 128 | 123 | 119 | 140 | 129 | 115 |
| OTR Improvement vs. Base | | % | | 4.2 | 6.8 | | 8.3 | 17.8 |
| 1.75 Mil Film | | | | | | | | |
| Basis Weight Gauge | | mils | 1.68 | 1.7 | 1.78 | 1.8 | 1.73 | 1.8 |
| OTR | Raw | cc/100 in$^2$/d | 78 | 76 | 62 | 81 | 79 | 71 |
| nOTR | | cc-mils/100 in$^2$/d | 131 | 129 | 109 | 145 | 137 | 128 |
| OTR Improvement vs. Base | | % | | 2.0 | 16.6 | | 5.2 | 11.6 |

Results from this experiment showed that the beneficial effects of the hydrogenated PDCPD on the MVTR could occur regardless of which catalyst is used to produce the HDPE (e.g., Resin Y is produced with a chromium/titanate catalyst and Resin Z is produced with a cyclopentadienyl chromium catalyst). Furthermore, a blend made with hydrogenated PDCPD and a HDPE having a lower MVTR has a better (e.g., lower) MVTR than a blend having the equivalent amount of hydrogenated PDCPD blended with a HDPE having a higher MVTR.

Example 4

Evaluation of the Effect on the Moisture Vapor Transmission Rate of Blending Hydrogenated poly (dicyclopentadiene) with HiD 9662 HDPE at Low Wt %

Raw hydrogenated PDCPD (Regalite T1140) was compounded with HiD 9662 base at 1, 3 and 5 wt % levels.

TABLE 4

| RESIN | | | C3H-0225 | C3H-0227 | C3H-0228 | C3H-0229 | Blend 1 |
|---|---|---|---|---|---|---|---|
| Description | | | Control | | | | |
| Resin Base Type | | | HiD 9662 | HiD 9662 | HiD 9662 | HiD 9662 | |
| Masterbatch Addition | | % | 0 | 0 | 0 | 0 | 10 |
| Direct PDCPD Addition | | | 0 | 1 | 3 | 5 | 0 |
| PDCPD Concentration | | % | 0 | 1 | 3 | 5 | 5 |
| Incorporation Method | | | | Compounded | Compounded | Compounded | MB/Dryblend |
| RESIN PROPERTIES | | | | | | | |
| Melt Index | | g/10 min | 0.97 | 0.99 | 1.06 | 1.18 | |
| Density | Resin | g/cc | 0.9618 | 0.963 | 0.9662 | 0.9697 | |
| FILM PROPERTIES (1.5 MIL FILM) | 1.5 mil film | | | | | | |
| Elmendorf Tear | MD | g/mil | 18 | 18 | 17 | 16 | 17 |
| | TD | g/mil | 785 | 779 | 921 | 428 | 351 |
| % Secant Modulus | MD | psi | 142400 | 134800 | 133800 | 132900 | 128100 |
| | TD | psi | 178000 | 167900 | 167800 | 160400 | 162900 |
| BARRIER PROPERTIES | | | | | | | |
| MVTR | | | | | | | |
| 1.0 Mil Film | | | | | | | |
| Basis Weight Gauge | Actual | mils | 0.91 | 0.94 | 0.91 | 0.92 | 0.92 |
| MVTR | Raw | g/100 in$^2$/d | 0.317 | 0.298 | 0.280 | 0.258 | 0.256 |
| nMVTR | | g-mils/100 in$^2$/d | 0.289 | 0.280 | 0.255 | 0.237 | 0.235 |
| Improvement vs. Control | | % | 0.0 | 3.1 | 11.6 | 17.8 | 18.4 |
| 1.5 Mil Film | | | | | | | |
| Basis Weight Gauge | Actual | mils | 1.4 | 1.35 | 1.33 | 1.35 | 1.41 |
| MVTR | Raw | g/100 in$^2$/d | 0.190 | 0.194 | 0.184 | 0.173 | 0.165 |
| nMVTR | | g-mils/100 in$^2$/d | 0.266 | 0.262 | 0.245 | 0.233 | 0.232 |
| Improvement vs. Control | | % | | 1.6 | 7.9 | 12.4 | 12.9 |
| Description | | | Control | | | | |
| Resin Base Type | | | HiD 9662 | HiD 9662 | HiD 9662 | HiD 9662 | |
| Masterbatch Addition | | % | 0 | 0 | 0 | 0 | 10 |
| Direct PDCPD Addition | | | 0 | 1 | 3 | 5 | 0 |
| PDCPD Concentration | | % | 0 | 1 | 3 | 5 | 5 |
| Incorporation Method | | | | Compounded | Compounded | Compounded | MB/Dryblend |
| 1.75 Mil Film | | | | | | | |
| Basis Weight Gauge | Actual | mils | 1.74 | 1.83 | 1.79 | 1.75 | 1.85 |
| MVTR | Raw | g/100 in$^2$/d | 0.171 | 0.159 | 0.150 | 0.147 | 0.137 |
| nMVTR | | g-mils/100 in$^2$/d | 0.298 | 0.292 | 0.268 | 0.257 | 0.254 |
| Improvement vs. Control | | % | 0.0 | 2.0 | 10.1 | 13.5 | 14.6 |
| OTR | | | | | | | |
| 1.0 Mil Film | | | | | | | |
| Basis Weight Gauge | Actual | mils | 1 | 0.95 | 1 | 1 | 1 |
| OTR | Raw | cc/100 in$^2$/d | 150 | 143 | 132 | 113 | 115 |
| nOTR | | cc-mils/100 in$^2$/d | 150 | 136 | 132 | 113 | 115 |
| Improvement vs. Control | 1 mil film | % | 0.0 | 9.6 | 12.2 | 24.8 | 23.6 |
| 1.5 Mil Film | | | | | | | |
| Basis Weight Gauge | Actual | mils | 1.5 | 1.4 | 1.4 | 1.45 | 1.5 |
| OTR | Raw | cc/100 in$^2$/d | 97 | 94 | 88 | 81 | 76 |
| nOTR | | cc-mils/100 in$^2$/d | 146 | 132 | 123 | 117 | 114 |
| Improvement vs. Control | 1.5 mil film | % | 0.0 | 9.3 | 15.8 | 19.4 | 21.8 |
| 1.75 Mil Film | | | | | | | |
| Basis Weight Gauge | Actual | mils | 2 | 2.03 | 2 | 2 | 2 |
| OTR | Raw | cc/100 in$^2$/d | 84 | 77 | 63 | 60 | 60 |
| nOTR | | cc-mils/100 in$^2$/d | 168 | 157 | 126 | 121 | 120 |
| Improvement vs. Control | 1.75 mil film | % | 0.0 | 6.8 | 24.8 | 28.3 | 28.5 |

Discussion of Results for Examples 1–4

Addition of hydrogenated PDCPD at concentrations ranging from 0.5 to 5% by weight has a beneficial effect on the moisture barrier properties of HDPE film grade resins. As the level of hydrogenated PDCPD is increased from 0.5 to 5%, the moisture barrier properties improve (e.g., MVTR decreases relative to HDPE alone). Addition of hydrogenated PDCPD has a similar effect on the oxygen barrier properties of HDPE (e.g., decreasing OTR of blends relative to OTR of HDPE alone).

The choice of the base HDPE to which the hydrogenated PDCPD is added has an effect on the final barrier properties of the film. That is, at equivalent additions of hydrogenated PDCPD to HDPE blends, blends comprising HDPE base resins demonstrating the best barrier properties alone will tend to have the best barrier properties as the blends. The improved barrier properties seen upon addition of small amounts of hydrogenated PDCPD to HDPE is seen regardless of which catalyst was used to produce the HDPE. Restated, the catalyst used to produce the HDPE does not interfere with improvement of barrier properties upon addition of the hydrogenated PDCPD.

It is possible to blend hydrogenated PDCPD to HDPE in either masterbatch form or in raw form to achieve barrier enhancement. The stiffness of HDPE blend films containing hydrogenated PDCPD decreases with increasing wt % of hydrogenated PDCPD based on Secant Modulus measurements. The TD (transverse direction) tear strength of HDPE blend films comprising hydrogenated PDCPD decreases with increasing wt % of hydrogenated PDCPD in the blend. When examining blends having less than 3 wt % hydrogenated PDCPD, the firm density of a HDPE/hydrogenated PDCPD blend increases with increasing wt % of hydrogenated PDCPD.

Example 5

Evaluation of the Effect of the Molecular Weight and Glass Transition Temperature of the poly (dicyclopentadiene) on Barrier Properties and Physical Properties of Blends Compounded blends were prepared using HiD 9662 type flake and three different grades of PDCPD, the same grade used in Example 4, Hercules T1140 (Mw=750, Tg=90° C.), and two grades of Exxon PDCPD, Escorez 5320 (Mw=430, Tg=65° C.) and 5340 (Mw=460, Tg=85° C.).

TABLE 5

| RESIN | | | C5H-0252 | C5H-0253 | C5H-0254 | C5H-0255 | C5H-0256 | C5H-0257 | C5H-0258 | C5H-0259 | C5H-0260 | C5H-0261 |
|---|---|---|---|---|---|---|---|---|---|---|---|---|
| Base Type | | | | | | | HiD 9662 | | | | | |
| Comment | | | Control | | | | | | | | | |
| PDCPD Type | | | | Regalite T1140 | | | Escorez 5320 | | | Escorez 5340 | | |
| Target Concentration | | % | | 1 | 3 | 5 | 1 | 3 | 5 | 1 | 3 | 5 |
| Actual Concentration | | % | 0 | 1.03 | 2.54 | 5.26 | 1.29 | 3.55 | 5.08 | 1.02 | 2.8 | 4.91 |
| RESIN PROPERTIES | | | | | | | | | | | | |
| Resin Density | | g/cc | 0.963 | 0.964 | 0.9659 | 0.9685 | 0.9647 | 0.967 | 0.9695 | 0.9645 | 0.9669 | 0.9689 |
| Film Density | | g/cc | 0.9533 | 0.9552 | 0.9575 | 0.9612 | 0.9556 | 0.9584 | 0.9551 | 0.9554 | 0.9582 | 0.9611 |
| Melt Index | | g/10 min | 1.03 | 0.95 | 1.11 | 1.11 | 0.9 | 1.05 | 1.16 | 0.95 | 1.04 | 1.18 |
| EXTRUSION PERFORMANCE | | | | | | | | | | | | |
| Output | | lbs/hr | 100 | 100 | 101 | 101 | 101 | 100 | 101 | 99.6 | 99.6 | 100.8 |
| Melt Temperature | | deg F | 416 | 416 | 414 | 415 | 415 | 414 | 414 | 413 | 414 | 415 |
| Extruder Pressure | | psi | 1807 | 1965 | 1819 | 2075 | 2268 | 2161 | 2070 | 2217 | 2139 | 2068 |
| BARRIER PROPERTIES MVTR | | | | | | | | | | | | |
| Film Gauge | Target | mils | 1 | 1 | 1 | 1 | 1 | 1 | 1 | 1 | 1 | 1 |
| | Actual Basis Weight (1) | mils | 0.93 | 0.98 | 0.98 | 0.96 | 0.98 | 0.98 | 0.98 | 0.98 | 1.01 | 1.03 |
| | Actual Basis Weight (2) | mils | 0.96 | 0.96 | 0.98 | 0.96 | 0.94 | 0.96 | 0.98 | 0.94 | 1.01 | 0.99 |
| MVTR | Raw (1) | g/100 in$^2$/d | 0.302 | 0.298 | 0.277 | 0.263 | 0.290 | 0.283 | 0.282 | 0.273 | 0.257 | 0.251 |
| | Raw (2) | g/100 in$^2$/d | 0.313 | 0.297 | 0.279 | 0.268 | 0.295 | 0.283 | 0.279 | 0.283 | 0.259 | 0.257 |
| nMVTR | | g-mils/100 in$^2$/d | 0.281 | 0.292 | 0.272 | 0.253 | 0.284 | 0.277 | 0.276 | 0.268 | 0.259 | 0.259 |
| | | g-mils/100 in$^2$/d | 0.301 | 0.286 | 0.273 | 0.257 | 0.277 | 0.272 | 0.274 | 0.266 | 0.261 | 0.254 |
| | Average | g-mils/100 in$^2$/d | 0.291 | 0.289 | 0.272 | 0.255 | 0.281 | 0.275 | 0.275 | 0.267 | 0.260 | 0.256 |
| | Improvement vs. Control | % | | 0.75 | 6.35 | 12.38 | 3.59 | 5.62 | 5.49 | 8.31 | 10.56 | 11.90 |
| Film Gauge | Target | mils | 1.85 | 1.85 | 1.85 | 1.85 | 1.85 | 1.85 | 1.85 | 1.85 | 1.85 | 1.85 |
| | Actual Basis Weight (1) | mils | 1.97 | 1.84 | 1.76 | 1.81 | 1.74 | 1.84 | 1.86 | 1.89 | 1.77 | 1.81 |
| | Actual Basis Weight (2) | mils | 1.97 | 1.84 | 1.77 | 1.84 | 1.74 | 1.89 | 1.82 | 1.89 | 1.77 | 1.79 |
| MVTR | Raw (1) | g/100 in$^2$/d | 0.141 | 0.151 | 0.146 | 0.121 | 0.139 | 0.133 | 0.133 | 0.128 | 0.124 | 0.119 |
| | Raw (2) | g/100 in$^2$/d | 0.144 | 0.144 | 0.138 | 0.134 | 0.134 | 0.130 | 0.131 | 0.121 | 0.119 | 0.116 |
| nMVTR | | g-mils/100 in$^2$/d | 0.278 | 0.278 | 0.256 | 0.219 | 0.241 | 0.245 | 0.247 | 0.242 | 0.219 | 0.215 |
| | | g-mils/100 in$^2$/d | 0.283 | 0.265 | 0.243 | 0.247 | 0.234 | 0.246 | 0.238 | 0.228 | 0.210 | 0.207 |
| | Average | g-mils/100 in$^2$/d | 0.280 | 0.272 | 0.250 | 0.233 | 0.237 | 0.245 | 0.242 | 0.235 | 0.215 | 0.211 |
| | Improvement vs. Control | % | | 3.09 | 10.85 | 16.96 | 15.31 | 12.46 | 13.58 | 16.10 | 23.38 | 24.84 |
| Base Type | | | | | | | HiD 9662 | | | | | |
| Comment | | | Control | | | | | | | | | |
| PDCPD Type | | | | Regalite T1140 | | | Escorez 5320 | | | Escorez 5340 | | |
| Target Concentration | | % | | 1 | 3 | 5 | 1 | 3 | 5 | 1 | 3 | 5 |
| Actual Concentration | | % | 0 | 1.03 | 2.54 | 5.26 | 1.29 | 3.55 | 5.08 | 1.02 | 2.8 | 4.91 |

TABLE 5-continued

| RESIN | | | C5H-0252 | C5H-0253 | C5H-0254 | C5H-0255 | C5H-0256 | C5H-0257 | C5H-0258 | C5H-0259 | C5H-0260 | C5H-0261 |
|---|---|---|---|---|---|---|---|---|---|---|---|---|
| OTR | | | | | | | | | | | | |
| Film Gauge | Target | mils | 1 | 1 | 1 | 1 | 1 | 1 | 1 | 1 | 1 | 1 |
| | Actual Basis Weight | mils | 0.95 | 0.97 | 0.98 | 0.96 | 0.96 | 0.97 | 0.98 | 0.96 | 1.01 | 1.01 |
| OTR | Raw | cc/100 in²/d | 152 | 124 | 118 | 113 | 130 | 112 | 105 | 126 | 108 | 103 |
| nOTR | | cc-mils/100 in²/d | 144 | 120 | 116 | 108 | 125 | 109 | 103 | 121 | 109 | 104 |
| | Improvement vs. Control | % | | 16.26 | 19.49 | 24.48 | 13.12 | 24.37 | 28.36 | 15.79 | 24.06 | 27.58 |
| Film Gauge | Target | mils | 1.85 | 1.85 | 1.85 | 1.85 | 1.85 | 1.85 | 1.85 | 1.85 | 1.85 | 1.85 |
| | Actual Basis Weight | mils | 1.97 | 1.84 | 1.77 | 1.83 | 1.74 | 1.87 | 1.84 | 1.89 | 1.77 | 1.80 |
| OTR | Raw | cc/100 in²/d | 107.00 | 61.00 | 62.00 | 59.00 | 72.00 | 67.00 | 62.00 | 52.00 | 54.00 | 52.00 |
| nOTR | | cc-mils/100 in²/d | 211 | 112 | 109 | 108 | 125 | 125 | 114 | 98 | 96 | 94 |
| | Improvement vs. Control | % | | 46.75 | 48.09 | 48.92 | 40.57 | 40.72 | 45.88 | 53.38 | 54.66 | 55.60 |
| PHYSICAL PROPERTIES | | | | | | | | | | | | |
| 1% Secant Modulus | MD | psi | 149900 | 150000 | 137900 | 129000 | 139900 | 130900 | 130500 | 143000 | 138400 | 139200 |
| | TD | psi | 183900 | 171400 | 165600 | 160000 | 167000 | 161600 | 147300 | 180200 | 173300 | 169100 |
| Tear Strength (1.0 mil) | MD | g/mil | 24 | 24 | 22 | 18 | 20 | 17 | 18 | 20 | 20 | 17 |
| | TD | g/mil | 1083 | 1194 | 1073 | 547 | 989 | 781 | 637 | 1068 | 925 | 677 |
| Tear Strength (1.85 mil) | MD | g/mil | 18 | 18 | 17 | 16 | 17 | 16 | 16 | 17 | 17 | 15 |
| | TD | g/mil | 508 | 208 | 170 | 85 | 281 | 141 | 142 | 323 | 158 | 78 |

Utilizing a lower molecular weight and higher Tg grade of PDCPD (e.g., Escorez 5340) yielded better barrier properties (MVTR & OTR) in blends comprising HDPE and low levels of the PDCPD. The improvement in MVTR and OTR in HDPE blends offered by the addition of PDCPD at low levels (<3%) becomes more obvious as the gauge of the film is increased. A PDCPD having a low molecular weight and a relatively low Tg (e.g., Exxon Escorez 5320) can negatively effect the stiffness of film prepared from a HDPE blend made with it (Secant Modulus). For addition levels of less than 3%, machine direction secant modulus (stiffness) favors the use of a higher Tg, lower Mw grade of PDCPD (e.g., Exxon Escorez 5340). Over the same range of addition, transverse direction secant modulus (stiffness) favors the use of a higher Tg, higher Mw grade of PDCPD (e.g., Hercules T1140). Retention of tear properties appears to favor the use of the higher Mw and higher Tg grade of PDCPD (e.g., Hercules Regalite T1140). However the benefit in tear retention offered by the higher Mw PDCPD appears to disappear with increasing film gauge.

Restated, data from this example suggests that the addition of PDCPD to HDPE has a beneficial effect on barrier properties and a detrimental effect on tear strength and stiffness. However, this data also suggests that there is a relationship between Mw and Tg of PDCPD grade selected and the magnitude of barrier improvement obtained and property loss encountered. The results of this study show that at equivalent Tg's, improvement in barrier properties appears to favor the use of a lower Mw grade of PDCPD and physical property retention appears to favor the use of a higher Mw grade of PDCPD.

Example 6

Evaluation of the Effect on the Moisture Vapor Transmission Rate and Oxygen Transmission Rate of Blending Hydrogenated Poly(dicyclopentadiene) Regalite T1140 with mPACT D449 HDPE and PE4517 Low Density Polyethylene (LDPE) at Low Wt %

Regalite T1140 was added at concentrations of 2 and 5 wt % to mPACT D449 HDPE and to PE4517 LDPE to ascertain its influence on the moisture vapor and oxygen transmission rates of the resulting blown films. Compounding for mPACT D449 HDPE films was based on dry-blends of a 50 wt % poly (dicyclopentadiene) master-batch with D449, and this dry blend was subsequently converted into blown film under the following conditions: 1.5 inch Davis Standard extruder with Maddox mixing sections, 4 inch Sano Film Die, 0.060 inch die gap, 3:1 blow-up ratio, dual lip air ring, 190° C. extruder barrel set temperature, 190° C. die set temperature, 55 lb/hr rate. The master-batch contained 50 wt % poly (dicyclopentadiene) and 50 wt % D449. Compounding for PE4517 LDPE films was based on dry-blends of a 50 wt % poly (dicyclopentadiene) master-batch with PE4517. The dry blend was subsequently converted into blown film under the following conditions: 1.5 inch Davis Standard extruder with Maddox mixing sections, 4 inch Sano Film Die, 0.060 inch die gap, 3:1 blow-up ratio, dual lip air ring, 210° C. extruder barrel set temperature, 210° C. die set temperature, 55 lb/hr rate. The master-batch contained 50 wt % poly (dicyclopentadiene) and 50 wt % PE4517. Both 1 mil and 2 mil blown films were evaluated.

TABLE 6

| Blend Description | 1 mil nMVTR g-mil/100 inch²/day | 1 mil nOTR cc-mil/100 inch²/day | 2 mil nMVTR g-mil/100 inch²/day | 2 mil nOTR cc-mil/100 inch²/day |
|---|---|---|---|---|
| mPACT D449 | 0.4952 | 200.18 | 0.3688 | 159.21 |
| 98 wt % D449/2 wt % Regalite T1140 | 0.4706 | 161.57 | 0.36 | 146 |
| 95 wt % D449/5 wt % Regalite T1140 | 0.4278 | 153.65 | 0.3347 | 126.32 |
| PE4517 | 1.0613 | 369.04 | 1.0053 | 393.94 |
| 98 wt % PE4517/2 wt % Regalite T1140 | 0.9461 | 345.65 | 0.9645 | 364.49 |
| 95 wt % PE4517/5 wt % Regalite T1140 | 0.9381 | 319.41 | 0.93 | 337.01 |

Improvement in water vapor barrier and oxygen barrier performance is noted with addition of Regalite T1140 in both D449 and PE4517 the 1 and 2 mil blown films.

It should be noted that the HDPE, resins used for their moisture barrier performance in food packaging applications usually yield films with high haze (haze>50%) or low clarity. However, mPACT D449 is known for its ability to produce exceptionally clear blown films (haze<10%) for its density. Addition of Regalite T1140 to mPACT D449 can result in a film with improved WVTR values without a reduction in clarity of the mPACT D449.

For mPACT D449 and PE 4517 LDPE, addition of small amounts of Regalite is T1140 (<5 wt %) does not appear to influence the impact strength or tear resistance of the resulting blown films.

Example 7

Evaluation of the Effect on the Moisture Vapor Transmission Rate and Oxygen Transmission Rate of Blending Hydrogenated PDCPD in Ternary Blends Comprising Two Polyethylenes and Regalite T1140

Blown films comprised of a ternary blend of a high-density polyethylene (HDPE) HiD 9662, hydrogenated polydicyclopentadiene (PDCPD) Regalite T1140, and a relatively small amount of HiD 9708 LMW-HDPE (low molecular weight, HDPE) were evaluated for their MVTR performance. The HiD 9708 has a lower molecular weight (or higher MI) compared to the HiD 9662. The ternary blends were prepared as dry blends of the three components followed by blown film processing under the conditions specified. MVTR data was obtained from blown films processed under the following conditions: 1.5 inch Davis Standard Extruder; 4 inch Sano Film Die with Dual Lip Air Ring; 0.060 inch Die Gap; 2.5:1 Blow-Up Ratio; Extruder (Barrel) and Die Set Temp: 190° C.; 55 lb/hr Extrusion Rate; and 0.8 mil film thickness.

TABLE 7

| Blend Description | nMVTR (g/100 inch²/day/mil) |
|---|---|
| HiD 9662 | 0.468 |
| HiD 9662/Regalite T1140: 97.1/2.9 (wt %) | 0.352 |
| HiD 9662/Regalite T1140/HiD 9708: 85.1/2.9/12 (wt %) | 0.328 |

The melt index (MI) of HiD 9662 is 1.0 dg/min and its density is 0.962 g/cc, while the MI of HiD 9708 is 8.0 dg/min and its density is 0.962 g/cc.

Addition of 2.9 wt % Regalite T1140 to HiD 9662 resulted in a 25% improvement in nMVTR. Adding 2.9 wt % Regalite T1140 and 12 wt % HiD 9708 (e.g., LMW-HDPE) to HiD 9662 resulted in a 30% improvement in nMVTR over HiD 9662 and a 7% improvement in nMVTR over the binary blend of HiD 9662/Regalite T1140. Addition of small amounts (1–30 wt %) of a low molecular weight polyethylene {100<$\eta_0$ (in Pa.s)<3000, or 2<MI (in dg/min) <1000} whose pellet density is at least 0.950 g/cm³ to a binary blend of HDPE and hydrogenated PDCPD (or any hydrogenated hydrocarbon) can result in a reduction in both the moisture vapor transmission rate (MVTR) and oxygen transmission rate (OTR) of the ultimate blown or cast film. $\eta_0$ is the zero-shear viscosity (low-shear rate or low-frequency Newtonian limit) of the polymer obtained from dynamic mechanical measurements (torsional rheology) performed at 190° C. The zero-shear viscosities (measured at 190° C.) of HiD 9662 and HiD 9708 are as follows:

| HiD 9662: | 56000 Pa.s |
|---|---|
| HiD 9708: | 1210 Pa.s |

Example 8

Evaluation of the Effect on the Moisture Vapor Transmission Rate and Oxygen Transmission Rate of Blending Regalite T1140 in HiD 9662

Low levels of Regalite T1140 were added to HiD 9662 and films were prepared from the composition. The MVTR, OTR, 1% secant modulus in the machine direction (MD), 1% secant modulus in the transverse direction (TD), and TD Elmendorf Tear were determined for various concentrations of the Regalite T1140 and for different gauges of film. The results are depicted in FIGS. 3 through 7.

The relationship between Regalite T1140 content and both MVTR and OTR follows a non-linear relationship. The non-linear relationship is evident for all gauges tested.

Both the MD and TD secant modulus or stiffness of the film have a non-linear relationship with the concentration of the Regalite T1140 in the film. The non-linear relationship is most apparent as the gauge of the film is increased. The effect of Regalite T1140 addition is most obvious in TD tear strength. Similarly, the effect of Regalite T1140 content on TD Elmendorf tear strength also appears to be gauge dependent. At higher gauges, the tear strength drops significantly with even the smallest addition of Regalite T1140, and the effect tends to decrease as the gauge of the film is reduced.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A moisture resistant composition, comprising:
   between about 0.5 wt % and 2.9 wt % of a low molecular weight hydrogenated aliphatic resin and between about 99.5 wt % and 95 wt % high density polyethylene, wherein the low molecular weight resin has a weight-average molecular weight of less than about 2000 g/mol.

2. The composition of claim 1, wherein the composition comprises between about 0.5 wt % and 2.5 wt % of the low molecular weight hydrogenated aliphatic resin.

3. The composition of claim 1, wherein the low molecular weight hydrogenated aliphatic resin is the product of hydrogenating a polymer produced by polymerizing a reaction mixture comprising dicyclopentadiene.

4. The composition of claim 1, wherein the low molecular weight hydrogenated aliphatic resin comprises hydrogenated poly(dicyclopentadiene).

5. The composition of claim 1, wherein the low molecular weight hydrogenated aliphatic resin has a weight-average molecular weight of between about 50 g/mol and 2000 g/mol.

6. The composition of claim 1, wherein the low molecular weight hydrogenated aliphatic resin has a glass transition temperature greater than about 50° C.

7. The composition of claim 1, wherein the low molecular weight hydrogenated aliphatic resin has a glass transition temperature greater than about 75° C.

8. The composition of claim 1, wherein the low molecular weight hydrogenated aliphatic resin has a glass transition temperature greater than about 80° C.

9. The composition of claim 1, wherein the high density polyethylene has a density of between about 0.940 and 0.966 g/cc.

10. The composition of claim 1, wherein the high density polyethylene has a density of between about 0.955 and 0.966 g/cc.

11. The composition of claim 1, wherein the high density polyethylene has a melt index of between about 0.1 and 100 dg/min.

12. The composition of claim 1, wherein further comprising at least about 100 ppm of at least one primary antioxidant.

13. The composition of claim 12, further comprising at least one secondary antioxidant.

14. The composition of claim 1, wherein the composition is incorporated in or coated onto a packaging article.

15. A method of preparing a moisture vapor resistant composition, comprising:
   blending high density polyethylene with a low molecular weight hydrogenated aliphatic resin, wherein the blend comprises between about 0.5 wt % and 2.9 wt % of the low molecular weight hydrogenated aliphatic resin and between about 99.5 wt % and 95 wt % high density polyethylene, wherein the low molecular weight resin has a weight-average molecular weight of less than about 2000 g/mol.

16. The method of claim 15, wherein the composition comprises between about 0.5 wt % and 2.5 wt % of the low molecular weight hydrogenated aliphatic resin.

17. The method of claim 15, wherein the low molecular weight hydrogenated aliphatic resin comprises hydrogenated poly (dicyclopentadiene).

18. The method of claim 15, wherein the low molecular weight hydrogenated aliphatic resin has a weight-average molecular weight of between about 50 g/mol and 2000 g/mol.

19. The method of claim 15, wherein the low molecular weight hydrogenated aliphatic resin has a glass transition temperature greater than about 50° C.

20. The method of claim 15, wherein the low molecular weight hydrogenated aliphatic resin has a glass transition temperature greater than about 75° C.

21. The method of claim 15, wherein the low molecular weight hydrogenated aliphatic resin has a glass transition temperature greater than about 80° C.

22. The method of claim 15, wherein the high density polyethylene has a density of between about 0.940 and 0.966 g/cc.

23. The method of claim 15, wherein the high density polyethylene has a density of between about 0.955 and 0.966 g/cc.

24. The method of claim 15, wherein the high density polyethylene has a melt index of between about 0.1 and 100 dg/min.

25. A packaging article, comprising:
   at least one layer comprising between about 0.5 wt % and 2.9 wt % of a low molecular weight hydrogenated aliphatic resin and between about 99.5 wt % and 95 wt % high density polyethylene, wherein the low molecular weight resin has a weight-average molecular weight of less than about 2000 g/mol.

26. The packaging article of claim 25, wherein the layer comprises between about 0.5 wt % and 2.5 wt % of the low molecular weight hydrogenated aliphatic resin.

27. The packaging article of claim 25, wherein the low molecular weight hydrogenated aliphatic resin is the product of hydrogenating a polymer produced by polymerizing a reaction mixture comprising dicyclopentadiene.

28. The packaging article of claim 25, wherein the low molecular weight hydrogenated aliphatic resin comprises hydrogenated poly (dicyclopentadiene).

29. The packaging article of claim 25, wherein the low molecular weight hydrogenated aliphatic resin has a weight-average molecular weight of between about 50 g/mol and 2000 g/mol.

30. The packaging article of claim 25, wherein the low molecular weight hydrogenated aliphatic resin has a glass transition temperature greater than about 50° C.

31. The packaging article of claim 25, wherein the low molecular weight hydrogenated aliphatic resin has a glass transition temperature greater than about 75° C.

32. The packaging article of claim 25, wherein the low molecular weight hydrogenated aliphatic resin has a glass transition temperature greater than about 80° C.

33. The packaging article of claim 25, wherein the high density polyethylene has a density of between about 0.940 and 0.966 g/cc.

34. The packaging article of claim 25, wherein the high density polyethylene has a density of between about 0.955 and 0.966 g/cc.

35. The packaging article of claim 25, wherein the high density polyethylene has a melt index of between about 0.1 and 100 dg/min.

36. The packaging article of claim 25, wherein the layer comprises at least about 100 ppm of at least one primary antioxidant.

37. The packaging article of claim 36, wherein the layer further comprises at least one secondary antioxidant.

38. The packaging article of claim 25, wherein the article is a film.

39. The packaging article of claim 25, wherein the article is a cast film.

40. The packaging of claim 25, wherein the article is a blown film.

41. The packaging article of claim 25, wherein the layer is a coating or a laminate.

42. The packaging article of claim 25, wherein the article is prepared using blow molding or injection molding.

43. The packaging article of claim 40, wherein the composition has a normalized mvtr of less than about below 0.35 g·mil/100 in$^2$/day.

44. The packaging article of claim 25, wherein the article is a post oriented film.

45. The packaging article of claim 25, wherein the article is a biaxially oriented film.

46. A moisture resistant composition, comprising:
between about 0.5 and 25 wt % of a low molecular weight hydrogenated aliphatic resin and between about 99.5 wt % and 75 wt % of a branched or linear low density polyethylene, wherein the low molecular weight resin has a molecular weight of less than about 2000 g/mol and the branched or linear low density polyethylene has a density of less than about 0.940 g/cm$^3$.

47. The composition of claim 46, wherein the branched or linear low density polyethylene has a density of between about 0.910 and 0.925 g/cm$^3$.

48. The composition of claim 46, wherein the low molecular weight hydrogenated aliphatic resin is the product of hydrogenating a polymer produced by polymerizing a reaction mixture comprising dicyclopentadiene.

49. The composition of claim 46, wherein the low molecular weight hydrogenated aliphatic resin comprises hydrogenated poly (dicyclopentadiene).

50. The composition of claim 46, wherein the low molecular weight hydrogenated aliphatic resin has a molecular weight of between about 50 g/mol and 2000 g/mol.

51. The composition of claim 46, wherein the low molecular weight hydrogenated aliphatic resin has a glass transition temperature greater than about 50° C.

52. A moisture resistant composition, comprising:
between about 0.5 and 25 wt % of a low molecular weight hydrogenated aliphatic resin,
between about 8 and 30 wt % of a low molecular weight high density polyethylene, and
between about 45 and 92.5 wt % of a second high density polyethylene,
wherein the low molecular weight resin has a weight-average molecular weight of less than about 2000 g/mol, and the low molecular weight high density polyethylene has a zero-shear viscosity that is less than or equal to 0.9 times the zero-shear viscosity of the second high density polyethylene.

53. The composition of claim 52, wherein the second high density polyethylene has a melt index of between about 0.1 dg/min and 100 dg/min.

54. The composition of claim 52, wherein the second high density polyethylene is essentially the only other component in the composition besides the low molecular weight hydrogenated aliphatic resin and the low molecular weight high density polyethylene.

55. The composition of claim 52, wherein the low molecular weight hydrogenated aliphatic resin is the product of hydrogenating a polymer produced by polymerizing a reaction mixture comprising dicyclopentadiene.

56. The composition of claim 52, wherein the low molecular weight hydrogenated aliphatic resin comprises hydrogenated poly(dicyclopentadiene).

57. The composition of claim 52, wherein the low molecular weight hydrogenated aliphatic resin has a weight-average molecular weight of between about 50 g/mol and 2000 g/mol.

58. The composition of claim 52, wherein the low molecular weight hydrogenated aliphatic resin has a glass transition temperature greater than about 50° C.

59. The composition of claim 52, wherein the second high density polyethylene has density of between about 0.940 and 0.966 g/cc.

60. A moisture resistant composition, comprising:
between about 0.5 and 4 wt % of a low molecular weight hydrogenated aliphatic resin,
between about 1 and 30 wt % of a low molecular weight high density polyethylene, and
between about 66 and 98.5 wt % of a second high density polyethylene,
wherein the low molecular weight resin has a weight-average molecular weight of less than about 2000 g/mol, and the low molecular weight high density polyethylene has a zero-shear viscosity that is less than or equal to 0.9 times the zero-shear viscosity of the second high density polyethylene.

61. The composition of claim 60, wherein the second high density polyethylene has a melt index of between about 0.1 dg/min and 100 dg/min.

62. The composition of claim 60, wherein the second high density polyethylene is essentially the only other component in the composition besides the low molecular weight hydrogenated aliphatic resin and the low molecular weight high density polyethylene.

63. The composition of claim 60, wherein the composition comprises between about 0.5 and 3.5 wt % of the low molecular weight hydrogenated aliphatic resin.

64. The composition of claim 63, wherein the second high density polyethylene is essentially the only other component in the composition besides the low molecular weight hydrogenated aliphatic resin and the low molecular weight high density polyethylene.

65. The composition of claim 60, wherein the low molecular weight hydrogenated aliphatic resin is the product of hydrogenating a polymer produced by polymerizing a reaction mixture comprising dicyclopentadiene.

66. The composition of claim 60, wherein the low molecular weight hydrogenated aliphatic resin comprises hydrogenated poly(dicyclopentadiene).

67. The composition of claim 60, wherein the low molecular weight hydrogenated aliphatic resin has a weight-average molecular weight of between about 50 g/mol and 2000 g/mol.

68. The composition of claim 60, wherein the low molecular weight hydrogenated aliphatic resin has a glass transition temperature greater than about 50° C.

69. The composition of claim 60, wherein the second high density polyethylene has a density of between about 0.940 and 0.966 g/cc.

* * * * *

UNITED STATES PATENT AND TRADEMARK OFFICE
CERTIFICATE OF CORRECTION

PATENT NO. : 6,770,712 B2
DATED : August 3, 2004
INVENTOR(S) : Gray A. Golze et al.

It is certified that error appears in the above-identified patent and that said Letters Patent is hereby corrected as shown below:

Column 25,
Line 49, delete "wherein".

Column 27,
Line 7, insert -- article -- between "packaging" and "of".

Signed and Sealed this

Fifth Day of April, 2005

JON W. DUDAS
*Director of the United States Patent and Trademark Office*